United States Patent
Yuki

(10) Patent No.: US 12,461,351 B2
(45) Date of Patent: Nov. 4, 2025

(54) ZOOM LENS AND IMAGE PICKUP APPARATUS

(71) Applicant: CANON KABUSHIKI KAISHA, Tokyo (JP)

(72) Inventor: Akihiko Yuki, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 418 days.

(21) Appl. No.: 17/971,780

(22) Filed: Oct. 24, 2022

(65) Prior Publication Data

US 2023/0185065 A1    Jun. 15, 2023

(30) Foreign Application Priority Data

Dec. 7, 2021 (JP) .................................. 2021-198652

(51) Int. Cl.
*G02B 15/173* (2006.01)
*G02B 13/02* (2006.01)

(52) U.S. Cl.
CPC ............ *G02B 15/173* (2013.01); *G02B 13/02* (2013.01)

(58) Field of Classification Search
CPC .................. G02B 15/173; G02B 13/02; G02B 15/145125; G02B 7/04; G02B 7/105; G02B 13/009
USPC ................................................ 359/676, 686
See application file for complete search history.

(56) References Cited

U.S. PATENT DOCUMENTS

| | | | |
|---|---|---|---|
| 4,844,599 A * | 7/1989 | Ito .................. | G02B 15/143503 359/740 |
| 9,069,156 B2 | 6/2015 | Ito et al. | |
| 9,470,878 B2 | 10/2016 | Yuki | |
| 10,718,930 B2 | 7/2020 | Kikuchi et al. | |
| 11,016,274 B2 | 5/2021 | Kikuchi et al. | |
| 11,275,235 B2 | 3/2022 | Yuki | |

(Continued)

FOREIGN PATENT DOCUMENTS

| JP | H08-136808 A | 5/1996 |
|---|---|---|
| JP | 2004-309761 A | 11/2004 |

(Continued)

OTHER PUBLICATIONS

Notice of Reasons for Refusal issued by the Japanese Patent Office on Jun. 4, 2024 in corresponding JP Patent Application No. 2021-198652, with English translation.

*Primary Examiner* — William R Alexander
*Assistant Examiner* — Mackenzi Waddell
(74) *Attorney, Agent, or Firm* — Carter, DeLuca & Farrell LLP

(57) ABSTRACT

A zoom lens includes, in order from an object side to an image side, a first lens unit that has a positive refractive power and does not move for zooming, a second lens unit that has a negative refractive power and moves in zooming, at least two lens units that move in zooming, and a final lens unit that has a positive refractive power, is disposed closest to the image side, and does not move for zooming. The first lens unit includes, in order from the object side to the image side, a first sub-lens unit that has a negative refractive power and does not move for focusing, a second sub-lens unit that has a negative refractive power and moves for focusing, and a third sub-lens unit having a positive refractive power. A distance between the second sub-lens unit and the third sub-lens unit changes for focusing.

10 Claims, 13 Drawing Sheets

(56) References Cited

U.S. PATENT DOCUMENTS

| | | | |
|---|---|---|---|
| 2013/0208155 A1* | 8/2013 | Hatada | G02B 15/145125 |
| | | | 359/557 |
| 2016/0349531 A1* | 12/2016 | Kawamura | G02B 15/173 |
| 2017/0357082 A1* | 12/2017 | Su | G02B 15/173 |
| 2018/0267279 A1* | 9/2018 | Fujikura | G02B 15/167 |
| 2022/0260815 A1 | 8/2022 | Yuki et al. | |

FOREIGN PATENT DOCUMENTS

| | | | |
|---|---|---|---|
| JP | 2015-018083 A | | 1/2015 |
| JP | 2016009122 A | * | 1/2016 |
| JP | 2019-039945 A | | 3/2019 |
| JP | 2021-067703 A | | 4/2021 |
| JP | 2020-0160265 A | | 4/2022 |

* cited by examiner

ZOOM LENS AND IMAGE PICKUP APPARATUS

BACKGROUND

Technical Field

One of the aspects of the disclosure relates to a zoom lens and an image pickup apparatus.

Description of the Related Art

Zoom lenses for image pickup apparatuses such as television cameras, cinema cameras, digital still cameras, and video cameras are required to be compact and lightweight and have a wide angle of view, a high zoom ratio, and high optical performance. In addition, as the number of pixels in an image sensor mounted on the image pickup apparatus becomes larger, the zoom lens is required to have higher resolving power from a central portion to a peripheral portion of an image and little chromatic aberration.

Each of Japanese Patent Laid-Open Nos. ("JPs") 8-136808 and 2004-309761 discloses a zoom lens that includes, in order from an object side to an image side, a first lens unit that has positive refractive power and does not move for zooming, a second lens unit that has negative refractive power and moves during zooming, a third lens unit that has negative refractive power and moves for image plane compensation during zooming, an aperture stop (diaphragm), and a final lens unit that has positive refractive power and is fixed during zooming. In this zoom lens, the first lens unit includes a first sub-lens unit L1a having negative refractive power, a second sub-lens unit L1b having negative refractive power, and a third sub-lens unit L1c having positive refractive power, and the second sub-lens unit L1b is responsible for focusing so as to realize an inner focus system.

It is important for the thus-configured zoom lens to select a proper refractive power arrangement and a glass material for a plurality of lens units in order to realize a compact and lightweight structure and high optical performance. However, for higher specifications such as a large aperture diameter and a high zoom ratio, it is difficult to acquire high optical performance due to various aberrations including longitudinal chromatic aberration and lateral chromatic aberration.

SUMMARY

An aspect of the disclosure provides, for example, a zoom lens beneficial in a small size and weight, high specification, and high optical performance over an entire zoom range.

A zoom lens according to one aspect of the disclosure includes, in order from an object side to an image side, a first lens unit that has a positive refractive power and does not move for zooming, a second lens unit that has a negative refractive power and moves in zooming, at least two lens units that move in zooming, and a final lens unit that has a positive refractive power, is disposed closest to the image side, and does not move for zooming. The first lens unit includes, in order from the object side to the image side, a first sub-lens unit that has a negative refractive power and does not move for focusing, a second sub-lens unit that has a negative refractive power and moves for focusing, and a third sub-lens unit having a positive refractive power. A distance between the second sub-lens unit and the third sub-lens unit changes for focusing. The second sub-lens unit includes a negative lens. Following inequalities are satisfied:

$$0.2 \leq f1b/f1a \leq 3.2$$
$$35 \leq vbn \leq 100$$

where f1a is a focal length of the first sub-lens unit, f1b is a focal length of the second sub-lens unit, and vbn is an Abbe number with respect to d-line of the negative lens in the second sub-lens unit.

An image pickup apparatus according to another aspect of the disclosure includes the above a zoom lens, and an image sensor configured to capture an image formed through the zoom lens.

Further features of the disclosure will become apparent from the following description of exemplary embodiments with reference to the attached drawings.

DESCRIPTION OF THE EMBODIMENTS

Figure 1:
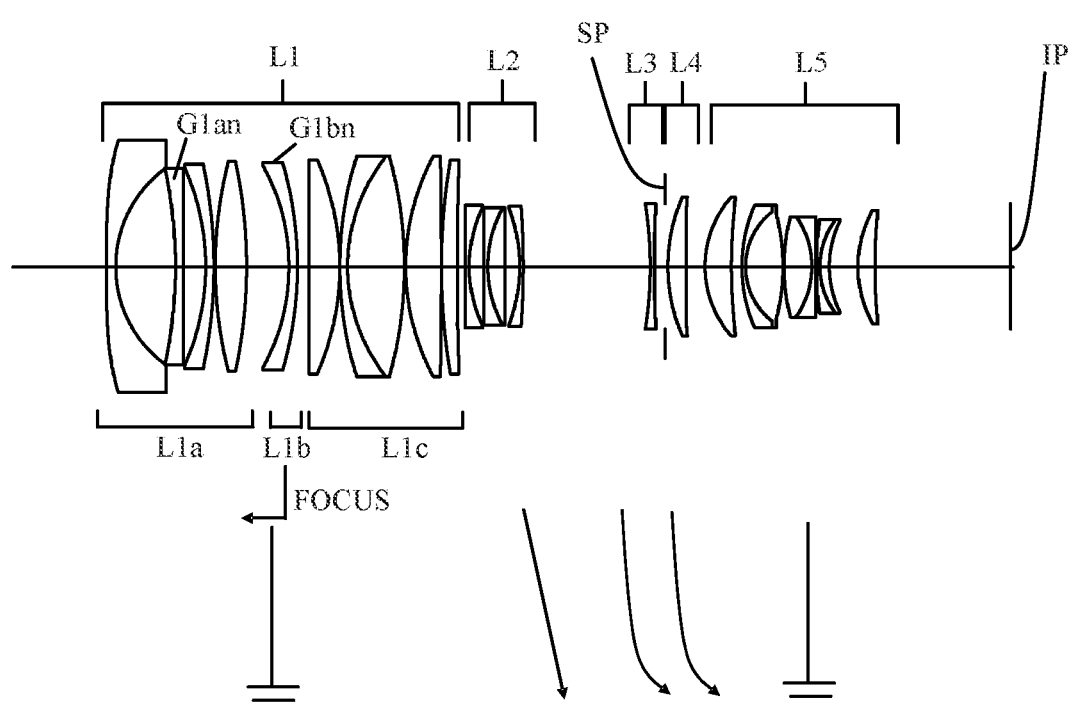
FIG. 1 is a sectional view of a zoom lens according to Example 1 (numerical example 1).

Referring now to the accompanying drawings, a description will be given of embodiments according to the disclosure. FIGS. 1, 4, 7, 10, 13, and 16 illustrate arrangements of lens units in zoom lenses according to Examples 1, 2, 3, 4, 5, and 6 at wide-angle ends in in-focus states on infinite objects, respectively. The zoom lens according to each example is used for an image pickup apparatus such as a television broadcast camera, a movie (or cinema) camera, a general-purpose video camera, a digital still camera, and the like. Before specific Examples 1 to 6 are described, a description will now be given of matters common to each example.

In the zoom lens, the lens unit is a group of one or more lenses that move together during magnification variation (zooming) between a wide-angle end and a telephoto end. That is, a distance between adjacent lens units changes during zooming. The lens unit may include an aperture stop. The wide-angle end and telephoto end correspond to the maximum angle of view (shortest focal length) and the minimum angle of view (longest focal length), respectively, in a case where the lens units that move during zooming are located at both ends of a movable range on an optical axis due to mechanical or control reasons.

In each figure, a left side is an object side (front side) and a right side is an image side (rear side). The zoom lens according to each example includes, in order from the object side to image side, a first lens unit L1 that has positive refractive power (reciprocal of focal length) and does not move (or is fixed) during (or for) zooming, a second lens unit L2 that has negative refractive power and moves during zooming, at least two other lens units (L3, L4) that move during zooming, and a final lens unit (L5) that has positive refractive power, is disposed closest to the image plane, and does not move during zooming. Each example illustrates a zoom lens includes five lens units, but the zoom lens may include six or more lens units. The at least two other lens units that move during zooming may be three or more lens units. In the following description, a "lens unit having positive refractive power" and a "lens unit having negative refractive power" will be simply referred to as a "positive lens unit" and a "negative lens unit", respectively.

An imaging plane of a solid-state image sensor (photoelectric conversion element) in an image pickup apparatus or a film plane (photosensitive surface) of a film is disposed on an image plane IP.

The zoom lens according to each example includes an aperture stop SP that moves during zooming between a surface closest to the image plane of the second lens unit L2 and a surface closest to the object of the final lens unit.

In the zoom lens according to each example, the first lens unit L1 includes, in order from the object side to the image side, a first negative sub-lens unit L1a that does not move during focusing, a second negative sub-lens unit L1b that moves during focusing, and a third positive sub-lens unit L1c that does not move or moves during focusing. A sub-lens unit is a group of one or a plurality of lenses that move together during focusing between an in-focus state at infinity and an in-focus state on a close end (short distance end or closest end). That is, a distance between adjacent sub-lens units changes during focusing. A configuration that does not move the first sub-lens unit L1a of the first lens unit L1 and moves at least the second sub-lens unit L1b during focusing is suitable for achieving a compact and lightweight zoom lens having high optical performance.

In the zoom lens according to each example, the second sub-lens unit L2 includes a negative lens G1$bn$.

The zoom lens according to each example satisfies the following conditions illustrated by inequalities (1) and (2);

$$0.2 \leq f1b/f1a \leq 3.2 \quad (1)$$

$$35 \leq \nu1bn \leq 100 \quad (2)$$

where f1a is a focal length of the first sub-lens unit L1a, f1b is a focal length of the second sub-lens unit L1b, and ν1bn is an Abbe number for the d-line (wavelength 587.6 nm) of the negative lens G1$bn$ in the second sub-lens unit L1b.

The Abbe number νd for the d-line is expressed as follows:

$$\nu d=(Nd-1)/(NF-NC)$$

where Nd, NF, and NC are refractive indices for the d-line, F-line (wavelength 486.1 nm), and C-line (wavelength 656.3 nm), respectively.

There is conventionally known a zoom lens that includes, in order from the image side to the object side, a first positive lens unit that does not move during zooming, a second negative lens unit that moves during zooming, a third negative lens unit that moves for image plane compensation during zooming, and a fourth positive lens unit that does not move during zooming. Such a zoom lens is compact and lightweight and suitable for obtaining a high zoom ratio.

On the other hand, the zoom lens according to each example includes the first positive lens unit L1 that does not move during zooming, the second negative lens unit L2 that moves during zooming, the third negative or positive lens unit L3 that moves during zooming, the fourth positive lens unit L4, and the fifth positive lens unit L5 that does not move during zooming. Thus, since this zoom lens includes more lens units that move during zooming than that of the conventional zoom lens, this zoom lens is smaller and lighter and has a higher zoom ratio and higher performance.

A description will be given of the conditions illustrated by inequalities (1) and (2). As described above, the first lens unit L1 includes the first negative sub-lens unit L1a, the second negative sub-lens unit L1b, and the third positive sub-lens unit L1c, and the second sub-lens moves during focusing. In this configuration, in order to reduce a moving amount of the second sub-lens unit L2 and to miniaturize the first lens unit L1, it is effective to make higher the refractive power of the second negative sub-lens unit L1b relative to that of the first negative sub-lens unit L1a.

On the other hand, simply increasing the refractive power of the second negative sub-lens unit L1b will increase fluctuations in the longitudinal chromatic aberration in a case where a distance to be focused changes at the telephoto end. In order to suppress fluctuations in longitudinal chromatic aberration, it is important to properly set the refractive power of the second negative sub-lens unit L1b and to select a glass material of the negative lens G1bn in the second sub-lens unit L1b.

Inequality (1) defines a condition regarding a relationship between the focal lengths of the first sub-lens unit L1a and the second sub-lens unit L1b. In a case where f1b/f1a is lower than the lower limit of inequality (1), the negative refractive power of the second sub-lens unit L1b becomes too strong, the fluctuation of the longitudinal chromatic aberration at the telephoto end caused by the focal length increases, and it becomes difficult to acquire high optical performance. In a case where f1b/f1a is higher than the upper limit of inequality (1), the refracting power of the second sub-lens unit L1b becomes too weak, the moving amount of the second sub-lens unit L1b during focusing between the in-focus state at infinity and the in-focus state on the close end becomes large, and it becomes difficult to reduce the size of the first lens unit LL.

Inequality (2) defines a condition regarding the Abbe number of the negative lens G1bn in the second sub-lens unit L1b. In a case where ν1bn is lower than the lower limit of inequality (2), the Abbe number of the negative lens G1bn becomes too small, the fluctuation of the longitudinal chromatic aberration at the telephoto end caused by the focal length becomes significant, and it becomes difficult to obtain high optical performance. In a case where ν1bn is higher than the upper limit of inequality (2), the Abbe number of the negative lens G1bn becomes too large, the lateral chromatic aberration at the wide-angle end becomes large, and it becomes difficult to obtain high optical performance.

Satisfying the conditions illustrated by inequalities (1) and (2) in the zoom lens having the above configuration can provide a compact and lightweight zoom lens having high specification and high optical performance over the entire zoom range and focus range.

The zoom lens according to each example may satisfy at least one of the following conditions illustrated by inequalities (3) to (10).

$$0.1 \leq |f1c/f1a| \leq 0.9 \quad (3)$$

$$45 \leq \nu1an \leq 70 \quad (4)$$

$$0.2 \leq |f1/f1a| \leq 0.8 \quad (5)$$

$$0.2 \leq \beta1b \leq 0.8 \quad (6)$$

$$-2.0 \leq \beta1c \leq 0 \quad (7)$$

$$0.3 \leq |f2/f1| \leq 0.8 \quad (8)$$

$$0.3 \leq |f4/f3| \leq 0.7 \quad (9)$$

$$0.08 \leq (Lspt - Lspw)/Skw \leq 0.80 \quad (10)$$

In inequalities (3) to (10), f1c is a focal length of the third positive sub-lens unit L1c, and ν1an is an Abbe number based on the d-line of a negative lens G1an included in the first negative sub-lens unit L1a. f1 is a focal length of the first positive lens unit L1, β1b is lateral magnification of the second negative sub-lens unit L1b in the in-focus state at infinity, and β1c is lateral magnification of the third positive sub-lens unit L1c in the in-focus state at infinity. f2 is a focal length of the second negative lens unit L2, f3 and f4 are focal lengths of the third and fourth lens units L3 and L4, respectively, corresponding to the at least two other lens units that move during zooming. Lspw is a distance on the optical axis from the surface closest to the object of the first lens unit L1 at the wide-angle end to the aperture stop SP, and Lspt is a distance on the optical axis from the surface closest to the object of the first lens unit L1 to the aperture stop SP at the telephoto end. Skw is a distance on the optical axis from the surface closest to the image plane of the final lens unit to the image plane IP at the wide-angle end.

In the zoom lenses according to Examples 3 to 5, a condition illustrated by the following inequality (11) may be satisfied:

$$15 \leq \nu1bp \leq 40 \quad (11)$$

where the second negative sub-lens unit L1b includes a positive lens G1bp and ν1bp is an Abbe number of the positive lens G1bp based on the d-line.

Inequality (3) defines a condition regarding a relationship between the focal lengths of the third sub-lens unit L1c and the first sub-lens unit L1a. In a case where |f1c/f1a| is lower than the lower limit of inequality (3), the positive refractive power of the third sub-lens unit L1c becomes too strong, spherical aberration at the telephoto end increases, and it becomes difficult to obtain high optical performance. In a case where |f1c/f1a| is higher than the upper limit of inequality (3), the refracting power of the third sub-lens unit L1c becomes too weak, the overall optical length increases, and it becomes difficult to reduce the size of the zoom lens.

Inequality (4) indicates a condition regarding the Abbe number of the negative lens G1an in the first sub-lens unit L1a. In a case where ν1an is lower than the lower limit of inequality (4), the Abbe number of the negative lens G1bn becomes too small, lateral chromatic aberration at the wide-angle end becomes large, and it becomes difficult to obtain high optical performance. In a case where ν1an is higher than the upper limit of inequality (4), the Abbe number of the negative lens G1bn becomes too large, the lateral chromatic aberration at the telephoto end becomes large, and it becomes difficult to obtain high optical performance.

Inequality (5) defines a condition regarding a relationship between the focal lengths of the first lens unit L1 and the first sub-lens unit L1a. In a case where |f1/f1a| is lower than the lower limit of inequality (5), the positive refractive power of the first lens unit L1 becomes too strong, spherical aberration at the telephoto end increases, and it becomes difficult to obtain high optical performance. In a case where |f1/f1a| is higher than the upper limit of inequality (5), the refractive power of the first lens unit L1 becomes too weak, the overall optical length increases, and it becomes difficult to reduce the size of the zoom lens.

Inequality (6) and (7) respectively define conditions regarding lateral magnifications of the second sub-lens unit L1b and the third sub-lens unit L1c in the in-focus state at infinity. In each example, the first lens unit L1 that does not move during zooming includes a first negative sub-lens unit L1a, a second negative sub-lens unit L1b, and a third positive sub-lens unit L1c. During focusing, the first sub-lens unit L1a does not move, and at least the second sub-lens unit L1b moves. The sensitivity ES of the second sub-lens unit L1b as a focusing unit in this configuration can be expressed by the following expression.

$$ES = (1 - \beta1b^2) \times \beta1c^2 \times \beta2^2 \times \ldots \times \beta n^2$$

The larger the sensitivity ES of the focusing unit is, the smaller the moving amount of the focusing unit between the in-focus state at infinity and the in-focus state on the close end becomes. In a case where both the first sub-lens unit L1a and the second sub-lens unit L1*b* have negative refractive powers, the lateral magnification β1b of the second negative sub-lens unit L1*b* in the in-focus state at infinity satisfies β1b≤1 and it is necessary to make small β1b so as to increase the sensitivity ES of the focusing unit.

In a case where β1b is lower than the lower limit of inequality (6), the lateral magnification β1b of the second sub-lens unit L1*b* becomes too small, the fluctuation of the longitudinal chromatic aberration at the telephoto end caused by the focal length becomes large, and it becomes difficult to obtain high optical performance. In a case where β1b is higher than the upper limit of inequality (6), the lateral magnification β1b of the second sub-lens unit L1*b* becomes too large, and it becomes difficult to increase the sensitivity ES of the focusing unit. As a result, the moving amount of the second sub-lens unit L1*b* during focusing becomes too large, and it becomes difficult to reduce the size of the first lens unit L1 (that is, the zoom lens).

In a case where β1c is lower than the lower limit of inequality (7), the lateral magnification β1c of the third sub-lens unit L1*c* becomes too small, and it becomes difficult to increase the sensitivity ES of the focusing unit. As a result, the moving amount of the second sub-lens unit L1*b* during focusing becomes too large, and it becomes difficult to reduce the size of the zoom lens. In a case where β1c is higher than the upper limit of inequality (7), the lateral magnification β1c of the third sub-lens unit L1*c* becomes too large, spherical aberration at the telephoto end increases, and it becomes difficult to obtain high optical performance.

Inequality (8) defines a condition regarding a relationship between the focal lengths of the second lens unit L2 and the first lens unit L1. In a case where |f2/f1| is lower than the lower limit of inequality (8), the negative refractive power of the second lens unit L2 becomes too strong, and it becomes difficult to obtain high optical performance due to an increased curvature of field at the wide-angle end. In a case where |f2/f1| is higher than the upper limit of inequality (8), the refractive power of the second lens unit L2 becomes too weak, and it becomes difficult to reduce the size of the zoom lens due to an increased moving amount of the second lens unit L2 during zooming.

The zoom lens according to each example includes the third lens unit L3 having negative or positive refractive power and the fourth lens unit L4 having positive refractive power as at least two lens units that move during zooming. Inequality (9) defines a condition regarding a relationship between the focal lengths between the third lens unit L3 and the fourth lens unit L4. In a case where |f4/f3| is lower than the lower limit of inequality (9), the positive refractive power of the fourth lens unit L4 becomes too strong, spherical aberration increases over the entire zoom range, and it becomes difficult to obtain high optical performance. In a case where |f4/f3| is higher than the upper limit of inequality (9), the refractive power of the fourth lens unit L4 becomes too weak, the moving amount of the fourth lens unit L4 during zooming becomes large, and it is difficult to reduce the size of the zoom lens.

The zoom lens according to each example includes an aperture stop SP on the object side at the wide-angle end, and moves the aperture stop SP toward the image plane so that the aperture stop SP does not interfere with other moving lens units during zooming toward the telephoto end. This configuration suppresses an increase in the lens diameter of the first lens unit L1 while securing a peripheral light amount ratio at the wide-angle end in a case where an aperture diameter is increased. Inequality (10) defines a condition regarding the moving amount of aperture stop SP during zooming from the wide-angle end to the telephoto end.

In a case where (Lspt−Lspw)/Skw is lower than the lower limit of inequality (10), it becomes difficult to dispose the aperture stop SP sufficiently close to the object at the wide-angle end while interferences between the aperture stop SP and other lens units at the telephoto end are avoided. As a result, it becomes difficult to secure both the peripheral light amount ratio and the suppression of the lens diameter of the first lens unit L1 in a case where an aperture diameter is increased. In a case where (Lspt−Lspw)/Skw is higher than the upper limit of inequality (10), the moving amount of the aperture stop SP from the wide-angle end to the telephoto end becomes large, and height fluctuation of an off-axis ray passing through the final lens unit during zooming becomes too large. As a result, it becomes difficult to suppress fluctuation in the lateral chromatic aberration over the entire zoom range.

In the zoom lenses according to Examples 3 to 5, the second sub-lens unit L1*b* includes the positive lens G1*bp* and the negative lens G1*bn*. This configuration achromatizes the second sub-lens unit L1*b*, and mainly suppresses the fluctuation of the longitudinal chromatic aberration at the telephoto end caused by the focal length. In a case where ν1bp is lower than the lower limit of inequality (11), the Abbe number of the positive lens G1*bp* becomes too small, the fluctuation of the lateral chromatic aberration at the telephoto end caused by the focal length becomes large, and it becomes difficult to obtain high optical performance. In a case where ν1bp is higher than the upper limit of inequality (11), the Abbe number of the positive lens G1*bp* becomes too large, the fluctuation of the longitudinal chromatic aberration at the telephoto end caused by the focal length becomes large, and it becomes difficult to obtain high optical performance.

Numerical ranges of inequalities (1) to (11) may be set as follows.

$$0.3 \le flb/fla \le 3.2 \tag{1a}$$

$$40 \le \nu lbn \le 82 \tag{2a}$$

$$0.15 \le |flc/fla| \le 0.80 \tag{3a}$$

$$46 \le \nu lan \le 65 \tag{4a}$$

$$0.25 \le |fl/fla| \le 0.75 \tag{5a}$$

$$0.25 \le \beta bl \le 0.70 \tag{6a}$$

$$-1.50 \le \beta lc \le 0 \tag{7a}$$

$$0.32 \le |f2/fl| \le 0.76 \tag{8a}$$

$$0.32 \le |f4/f3| \le 0.65 \tag{9a}$$

$$0.08 \le (Lspt - Lspw)/Skw \le 0.70 \tag{10a}$$

$$17 \le \nu lbp \le 35 \tag{11a}$$

Numerical ranges of inequalities (1) to (11) may be set as follows.

$$0.4 \le flb/fla \le 1.5 \tag{1b}$$

$$40 \le \nu lbn \le 70 \tag{2b}$$

-continued $$0.17 \le |f1c/f1a| \le 0.60 \quad (3b)$$

$$46 \le v1an \le 62 \quad (4b)$$

$$0.28 \le |f1/f1a| \le 0.73 \quad (5b)$$

$$0.25 \le \beta 1b \le 0.65 \quad (6b)$$

$$-1.40 \le \beta 1c \le -1.06 \quad (7b)$$

$$0.33 \le |f2/f1| \le 0.80 \quad (8b)$$

$$0.33 \le |f4/f3| \le 0.62 \quad (9b)$$

$$0.2 \le (Lspt - Lspw)/Skw \le 0.6 \quad (10b)$$

$$17 \le v1bp \le 25 \quad (11b)$$

Each of Examples 1 to 6 will be explained below. Numerical examples 1 to 6 corresponding to Examples 1 to 6 will be illustrated after Example 6 is described.

Example 1

The zoom lens according to Example 1 (numerical example 1) illustrated in FIG. 1 includes, in order from the object side to the image side, the first positive lens unit L1, the second negative lens unit L2, the third negative lens unit L3, the fourth positive lens unit L4, and the fifth positive lens unit (final lens unit) L5. During zooming from the wide-angle end to the telephoto end, each of the first lens unit L1 and the fifth lens unit L5 does not move, the second lens unit L2 and the third lens unit L3 move, and the fourth lens unit L4 moves for image plane compensation. A moving trajectory of each moving unit during zooming from the wide-angle end to the telephoto end is illustrated under each moving unit during zooming in the drawing. This will be similarly applied to other examples described later.

The aperture stop SP is located next to the fourth lens unit L4 on the object side, and moves integrally with the fourth lens unit L4 in zooming from the wide-angle end to the telephoto end. This configuration reduces the size and weight of the first lens unit L1.

The first lens unit L1 includes, in order from the object side to the image side, the first negative sub-lens unit L1a that does not move during focusing, the second negative sub-lens unit L1b that moves during focusing, and the third positive sub-lens unit L1c that does not move during focusing. The second sub-lens unit L1b moves toward the object side during focusing from the in-focus state at infinity to the in-focus state on the close end, as indicated by the arrow below the second sub-lens unit L1b in FIG. 1. This configuration shortens the moving amount of the second sub-lens unit L1b during focusing between the in-focus state at infinity and the in-focus state on the close end, and achieves both miniaturization and high optical performance of the first lens unit L1 (that is, the zoom lens). The first sub-lens unit L1a includes the negative lens G1an, and the second sub-lens unit L1b includes only the negative lens G1bn.

The second lens unit L2 includes, in order from the object side to the image side, a negative lens, a negative lens, a positive lens, and a negative lens, and effectively suppresses lateral chromatic aberration at the wide-angle end and longitudinal chromatic aberration at the telephoto end. The third lens unit L3 includes a single negative lens, which reduces the mass of the moving unit during zooming, thereby contributing to miniaturization of the zoom lens. The fourth lens unit L4 includes a single positive lens, which reduces the mass of the moving unit during zooming, thereby contributing to miniaturization of the zoom lens. The fifth lens unit L5 includes three cemented lenses and contributes to effectively suppressing longitudinal chromatic aberration and lateral chromatic aberration over the entire zoom range to obtain high optical performance.

In numerical example 1, a surface number i denotes the order of surfaces counted from the object side. r denotes a radius of curvature of an i-th surface from the object side (mm), d is a lens thickness or air gap (mm) between an i-th surface and an (i+1)-th surface, and nd is a refractive index for the d-line of the optical material between the i-th surface and the (i+1)-th surface. νd is an Abbe number of an optical material between the i-th surface and the (i+1)-th surface based on the d-line.

BF denotes a back focus (mm). The "back focus" is a distance on the optical axis from the final surface (surface closest to the image plane) of the zoom lens to the paraxial image plane, expressed by an air conversion length. An "overall lens length" is a length obtained by adding the back focus to a distance on the optical axis from the front surface (surface closest to the object) to the final surface of the zoom lens.

An asterisk * attached to a surface number means that the surface has an aspherical shape. The aspherical shape is expressed by the following expression:

$$X = (H^2/R)/[1 + \{1 - (1+k)(H^2/R^2)\}^{1/2}] + A4 \cdot H^4 + A6 \cdot H^6 + A8 \cdot H^8$$

where X is a displacement amount from a surface vertex in the X-axis direction, H is a height from the optical axis in a direction orthogonal to the optical axis, a light traveling direction is set positive, R is a paraxial radius of curvature, K is a conic constant, and A4, A6, and A8 are aspheric coefficients.

"e-x" in conic constants and aspherical coefficients means ×10$^{-x}$. The explanation of the above numerical example will be similarly applied to other numerical examples.

Table 1 summarizes values of the conditions illustrated by inequalities (1) to (10) according to numerical example 1. Numerical example 1 satisfies the conditions illustrated by inequalities (1) to (10).

Figure 2A:
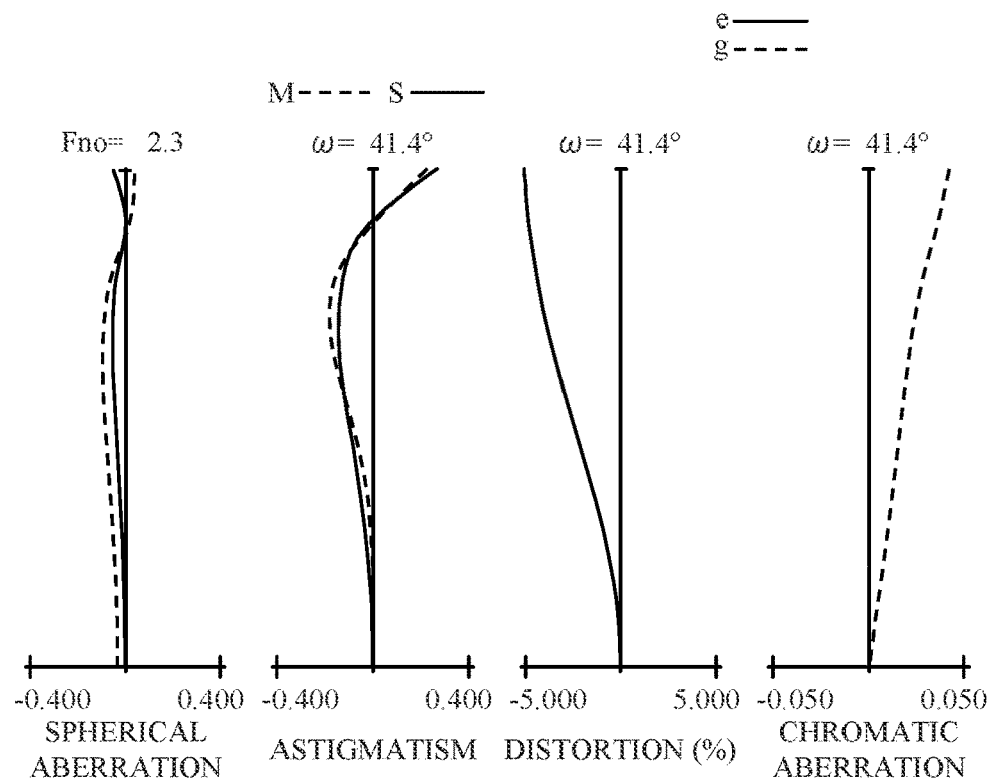
FIGS. 2A and 2B are aberration diagrams at a wide-angle end and an intermediate (middle) zoom position in an in-focus state at infinity of the zoom lens according to numerical example 1.
Figure 2B:
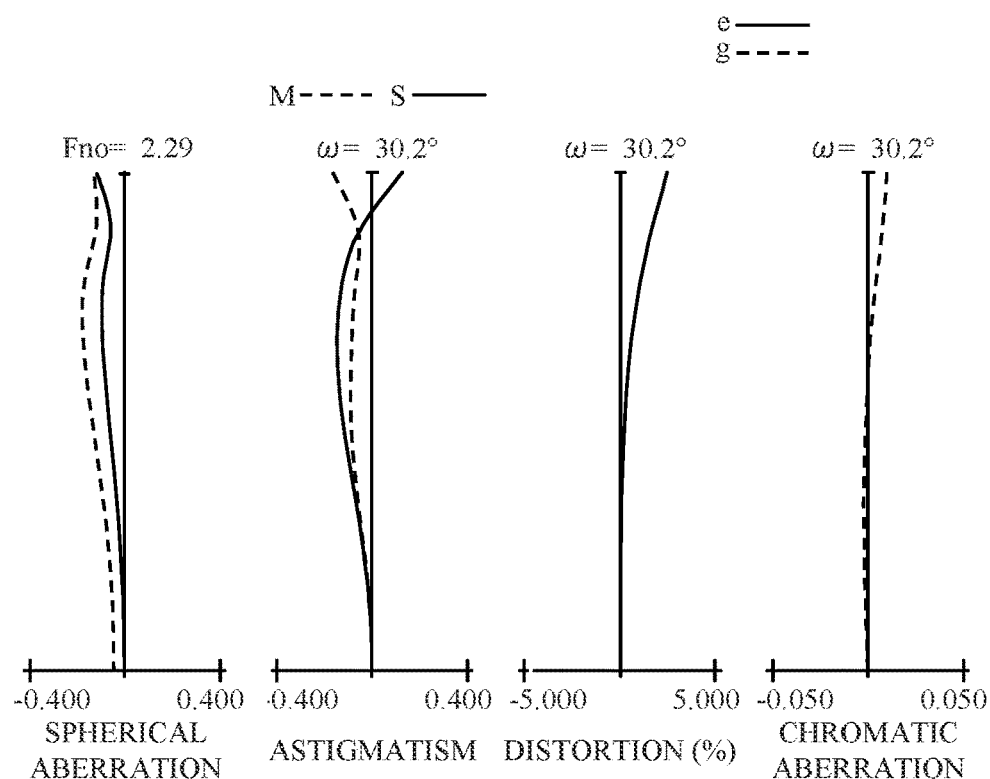
Figure 3:
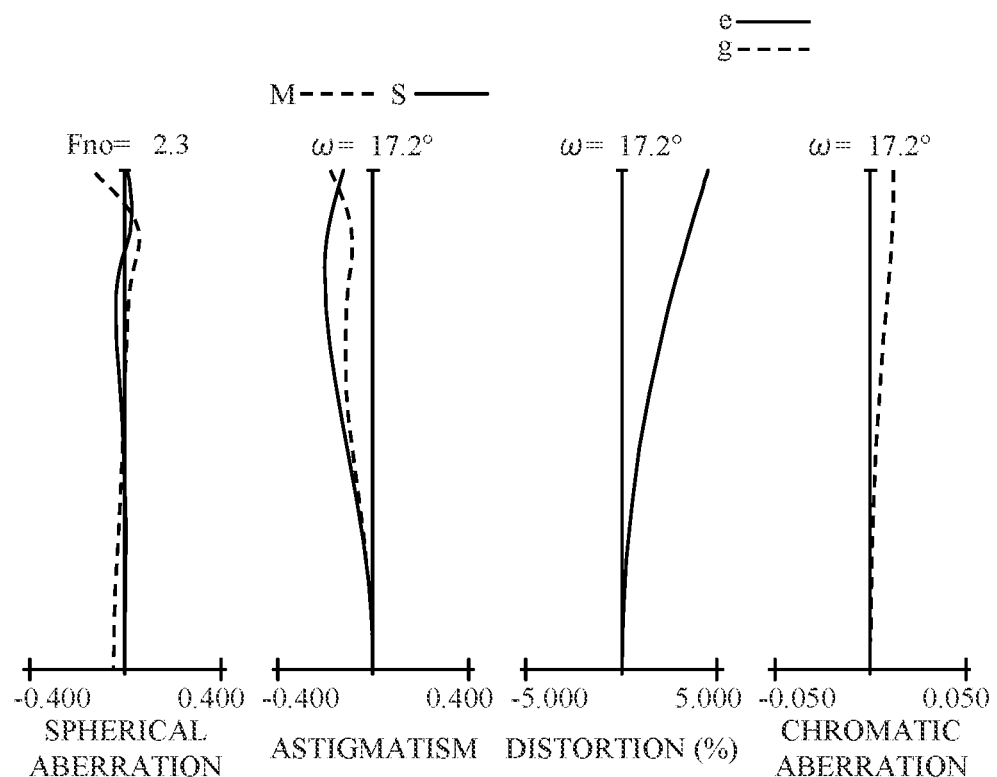
FIG. 3 is an aberration diagram at a telephoto end in the in-focus state at infinity of the zoom lens according to numerical example 1.

FIGS. 2A, 2B, and 3 respectively illustrate longitudinal aberrations (spherical aberration, astigmatism, distortion, and chromatic aberration) at the wide-angle end, intermediate zoom position, and telephoto end in the in-focus state at infinity of the zoom lens according to numerical example 1, respectively. In the spherical aberration diagram, Fno denotes an F-number, a solid line indicates spherical aberration for the e-line (wavelength: 546.1 nm), and a dashed line indicates spherical aberration for the g-line. In the astigmatism diagram, a solid line S indicates a sagittal image plane, and a dashed line M indicates a meridional image plane. ω is half an angle of view (°). The distortion diagram illustrates distortion for the e-line. The chromatic aberration diagram illustrates lateral chromatic aberration for the g-line. The spherical aberration diagram has a scale of 0.4 mm, the astigmatism diagram has a scale of 0.4 mm, the distortion diagram has a scale of 5%, and the lateral chromatic aberration diagram has a scale of 0.05 mm. The above description of the longitudinal aberration diagrams will be similarly applied to other numerical examples.

Example 2

Figure 4:
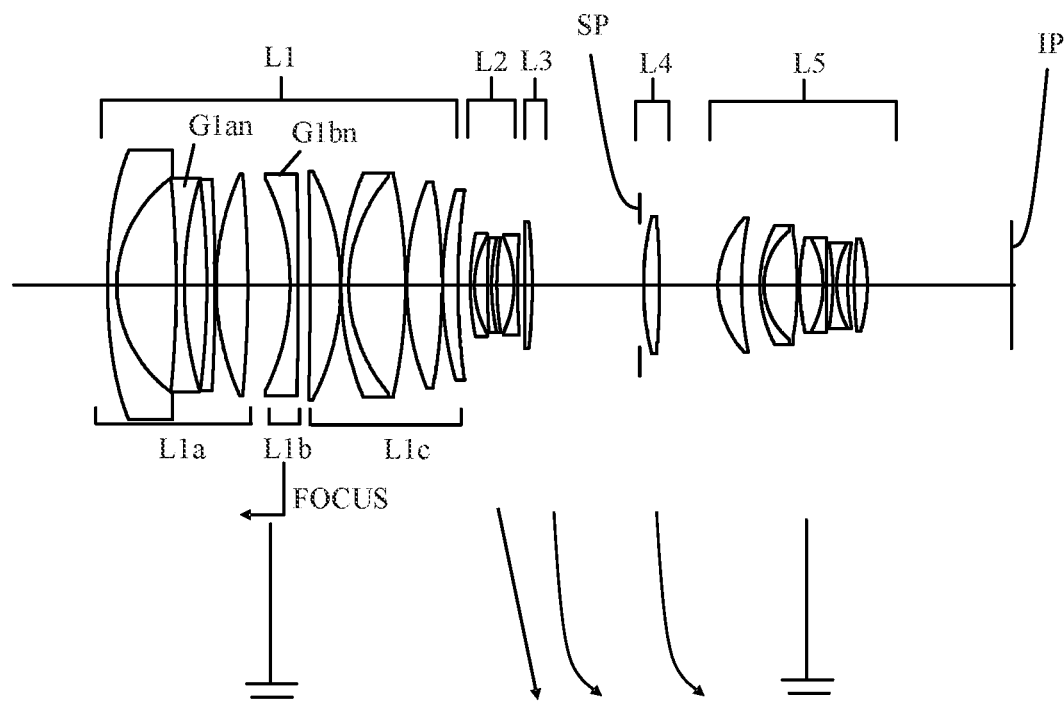
FIG. 4 is a sectional view of a zoom lens according to Example 2 (numerical example 2).

The zoom lens according to Example 2 (numerical example 2) illustrated in FIG. 4 includes, in order from the object side to the image side, the first positive lens unit L1, the second negative lens unit L2, the third positive lens unit L3, the fourth positive lens unit L4, and the fifth positive lens unit (final lens unit) L5. During zooming from the wide-angle end to the telephoto end, each of the first lens unit L1 and the fifth lens unit L5 does not move, the second lens unit L2 and the third lens unit L3 move, and the fourth lens unit L4 moves for image plane compensation.

The aperture stop SP is located closest to the object in the fourth lens unit L4, and moves integrally with the fourth lens unit L4 during zooming from the wide-angle end to the telephoto end. This configuration reduces the size and weight of the first lens unit L1.

The first lens unit L1 includes, in order from the object side to the image side, the first negative sub-lens unit L1a that does not move during focusing, the second negative sub-lens unit L1b that moves during focusing, and the third positive sub-lens unit L1c that does not move during focusing. The second sub-lens unit L1b moves toward the object side during focusing from the in-focus state at infinity to the in-focus state on the close end, as indicated by the arrow below the second sub-lens unit L1b in FIG. 4. This configuration shortens the moving amount of the second sub-lens unit L1b during focusing between the in-focus state at infinity and the in-focus state on the close end, and achieves both miniaturization and high optical performance of the zoom lens. The first sub-lens unit L1a includes the negative lens G1an, and the second sub-lens unit L1b includes only the negative lens G1bn.

The second lens unit L2 includes, in order from the object side to the image side, a negative lens, a negative lens, a positive lens, and a negative lens, and effectively suppresses lateral chromatic aberration at the wide-angle end and longitudinal chromatic aberration at the telephoto end. The third lens unit L3 includes a single negative lens, which reduces the mass of the moving unit during zooming, thereby contributing to miniaturization of the zoom lens. The fourth lens unit L4 includes a single positive lens, which reduces the mass of the moving unit during zooming, thereby contributing to miniaturization of the zoom lens. The fifth lens unit L5 includes three cemented lenses and contributes to effectively suppressing longitudinal chromatic aberration and lateral chromatic aberration over the entire zoom range to obtain high optical performance.

Table 1 summarizes values of the conditions illustrated by inequalities (1) to (10) according to numerical example 2. Numerical example 2 satisfies the conditions illustrated by inequalities (1) to (10).

Figure 5A:
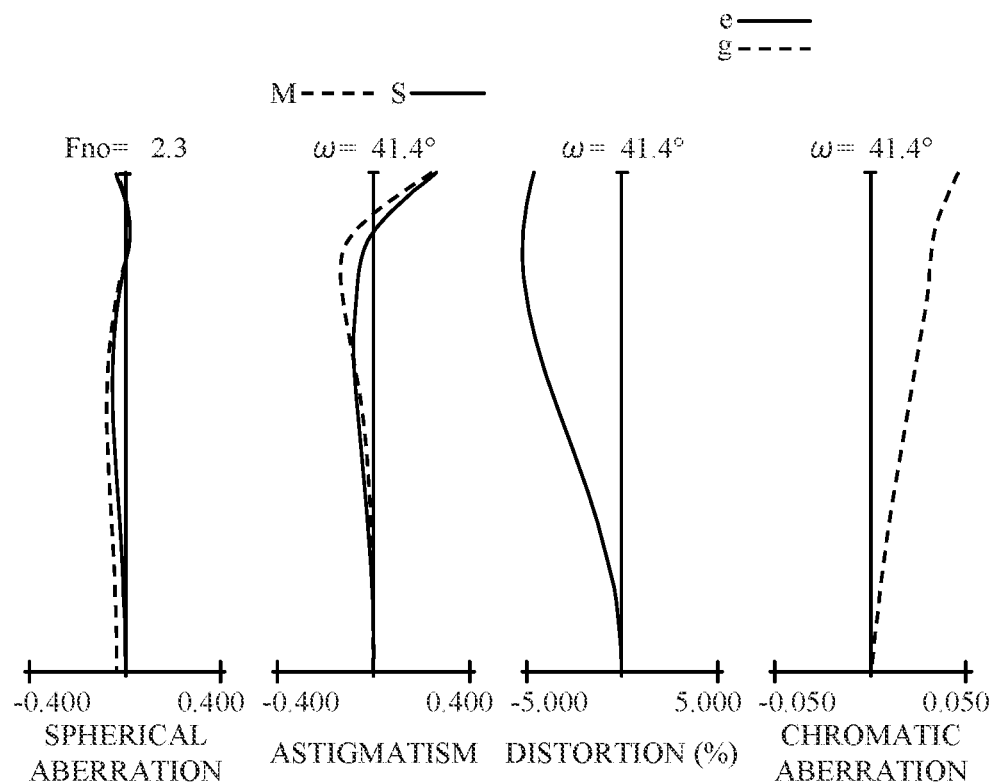
FIGS. 5A and 5B are aberration diagrams at the wide-angle end and intermediate zoom positions in the in-focus state at infinity of the zoom lens according to numerical example 2.
Figure 5B:
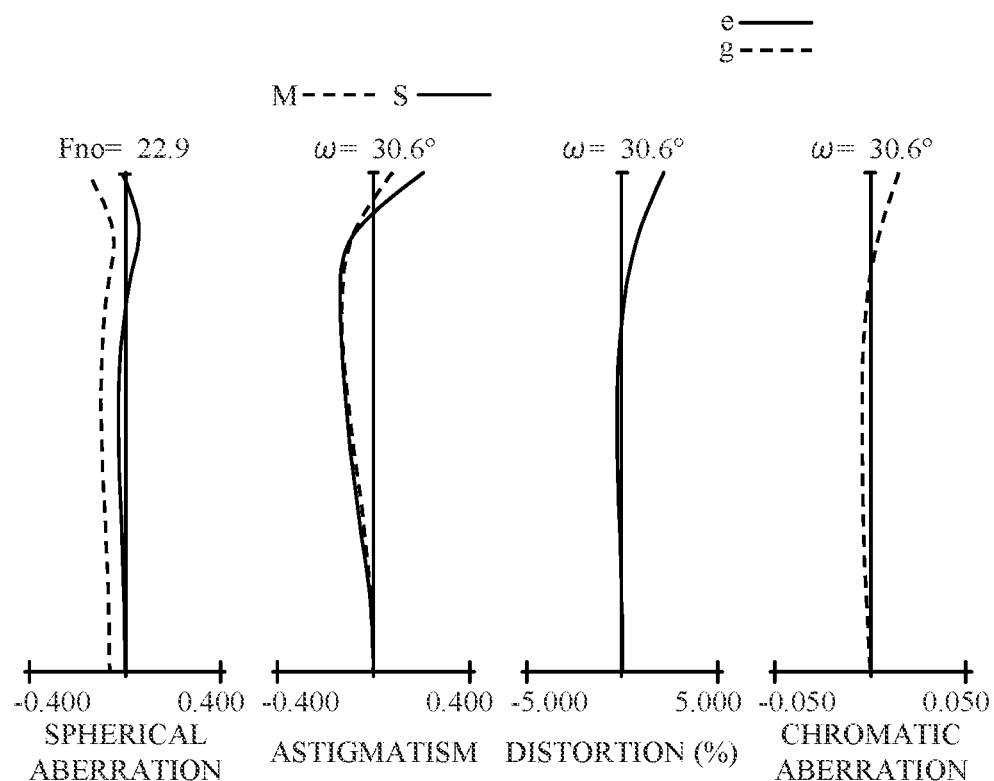
Figure 6:
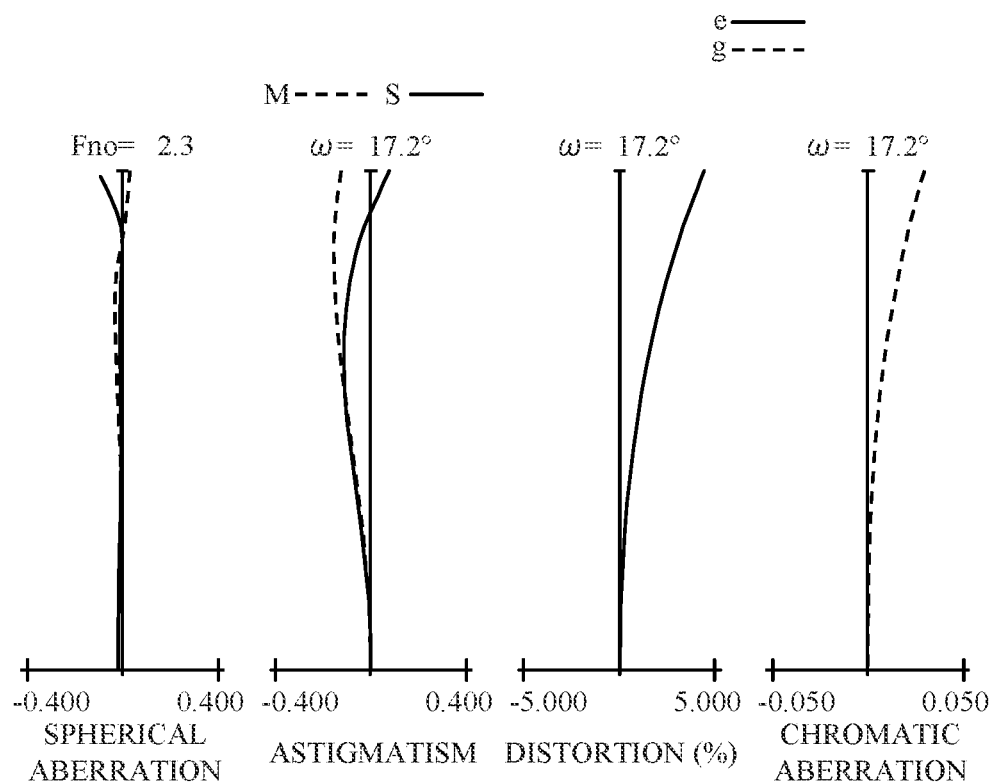
FIG. 6 is an aberration diagram at the telephoto end in the in-focus state at infinity of the zoom lens according to numerical example 2.

FIGS. 5A, 5B, and 6 illustrate longitudinal aberrations at the wide-angle end, intermediate zoom position, and telephoto end in the in-focus state at infinity of the zoom lens according to numerical example 2, respectively.

Examples 3, 4, and 5

Figure 7:
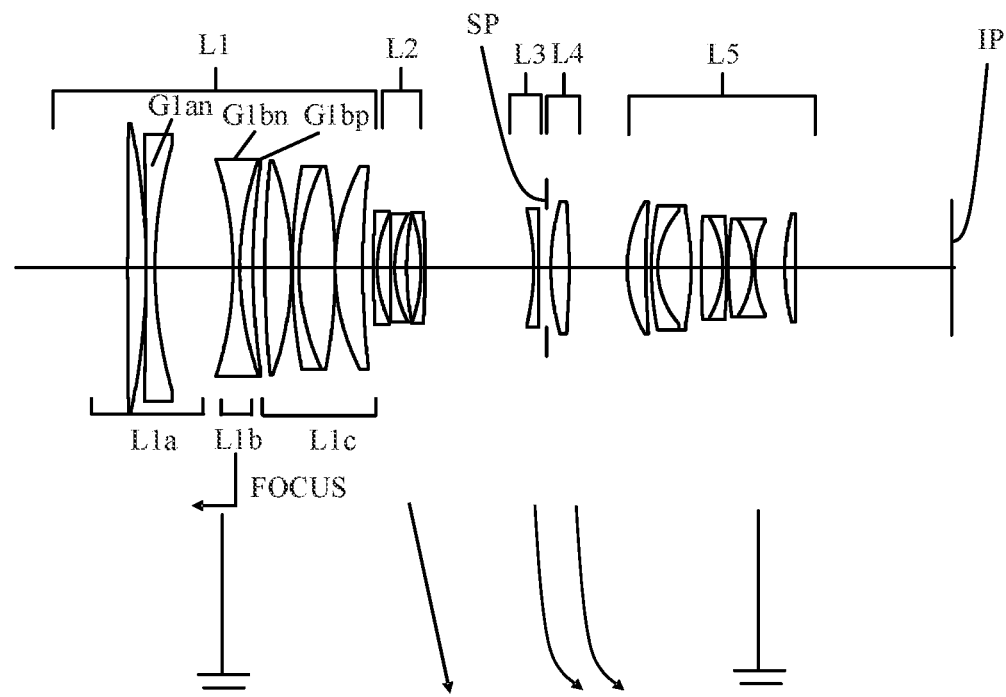
FIG. 7 is a sectional view of a zoom lens according to Example 3 (numerical example 3).

The zoom lens according to Example 3 (numerical example 3) illustrated in FIG. 7 includes, in order from the object side to the image side, the first positive lens unit L1, the second negative lens unit L2, the third negative lens unit L3, the fourth positive lens unit L4, and the fifth positive lens unit (final lens unit) L5. During zooming from the wide-angle end to the telephoto end, each of the first lens unit L1 and the fifth lens unit L5 does not move, the second lens unit L2 and the third lens unit L3 move, and the fourth lens unit L4 moves for image plane compensation.

The aperture stop SP is located closest to the object in the fourth lens unit L4, and moves integrally with the fourth lens unit L4 during zooming from the wide-angle end to the telephoto end. This configuration reduces the size and weight of the first lens unit L1.

The first lens unit L1 includes, in order from the object side to the image side, the first negative sub-lens unit L1a that does not move during focusing, the second negative sub-lens unit L b that moves during focusing, and the third positive sub-lens unit L1c that does not move during focusing. The second sub-lens unit L1b moves toward the object side during focusing from the in-focus state at infinity to the in-focus state on the close end, as indicated by the arrow below the second sub-lens unit L1b in FIG. 7. This configuration shortens the moving amount of the second sub-lens unit L1b during focusing between the in-focus state at infinity and the in-focus state on the close end, and achieves both miniaturization and high optical performance of the zoom lens. The first sub-lens unit L1a includes the negative lens G1an, and the second sub-lens unit L1b includes a cemented lens of a negative lens G1bn and a positive lens G1bp.

The second lens unit L2 includes, in order from the object side to the image side, a negative lens, a negative lens, a positive lens, and a negative lens, and effectively suppresses lateral chromatic aberration at the wide-angle end and longitudinal chromatic aberration at the telephoto end. The third lens unit L3 includes a single negative lens, which reduces the mass of the moving unit during zooming, thereby contributing to miniaturization of the zoom lens. The fourth lens unit L4 includes a single positive lens, which reduces the mass of the moving unit during zooming, thereby contributing to miniaturization of the zoom lens. The fifth lens unit L5 includes three cemented lenses and contributes to effectively suppressing longitudinal chromatic aberration and lateral chromatic aberration over the entire zoom range to obtain high optical performance.

Figure 10:
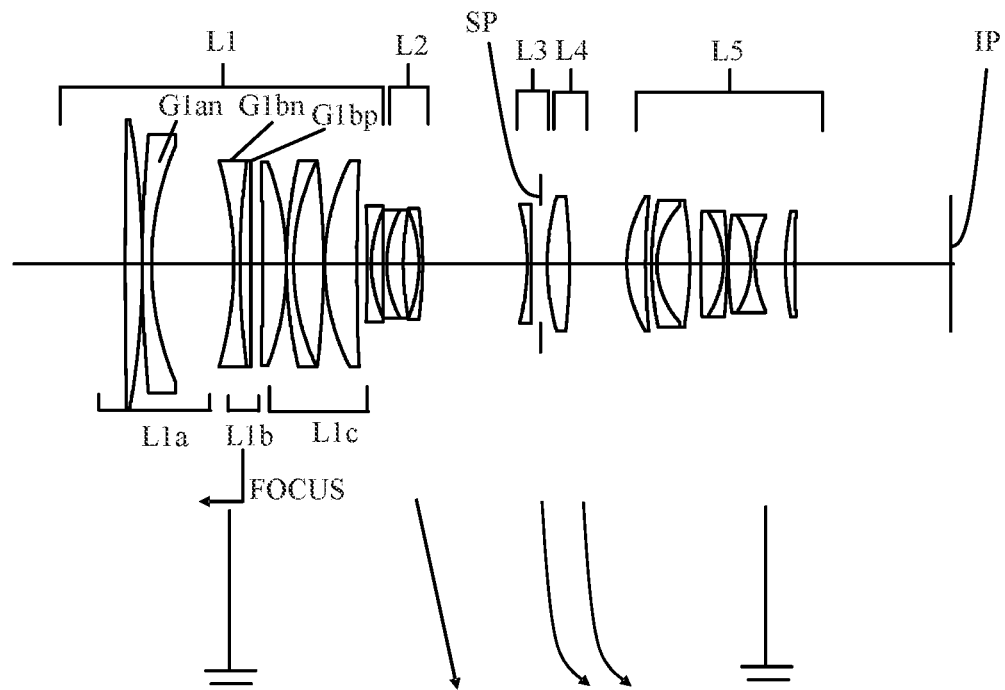
FIG. 10 is a sectional view of a zoom lens according to Example 4 (numerical example 4).
Figure 13:
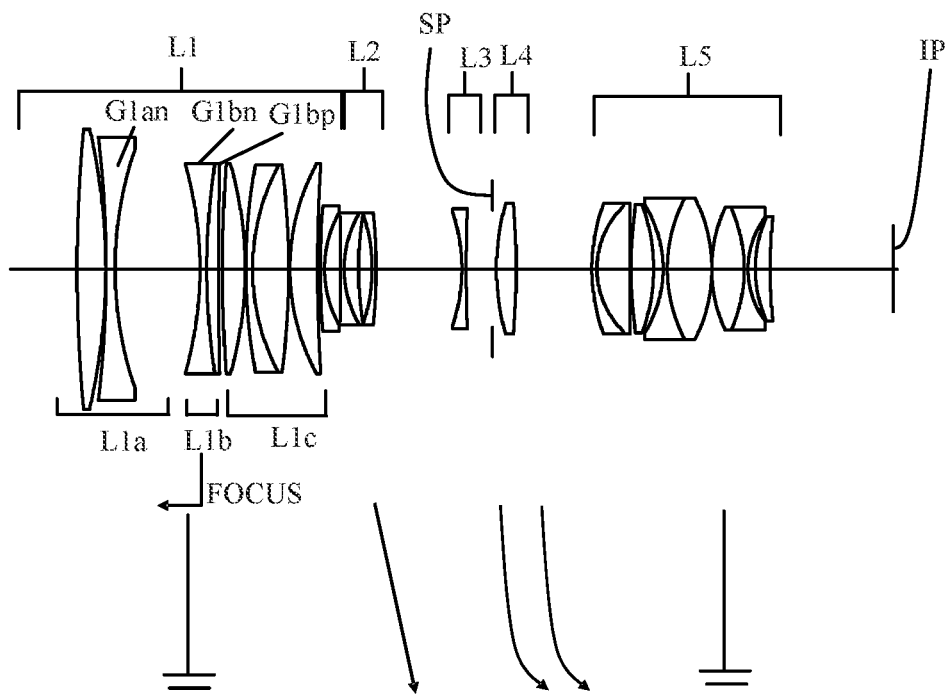
FIG. 13 is a sectional view of a zoom lens according to Example 5 (numerical example 5).

Each of the zoom lens according to Example 4 (numerical example 4) illustrated in FIG. 10 and the zoom lens according to Example 5 (numerical example 5) illustrated in FIG. 13 has a configuration similar to that of the zoom lens according to Example 3.

Table 1 summarizes values of the conditions illustrated by inequalities (1) to (11) according to numerical examples 3 to 5. Numerical examples 3 to 5 satisfy the conditions illustrated by inequalities (1) to (11).

Figure 8A:
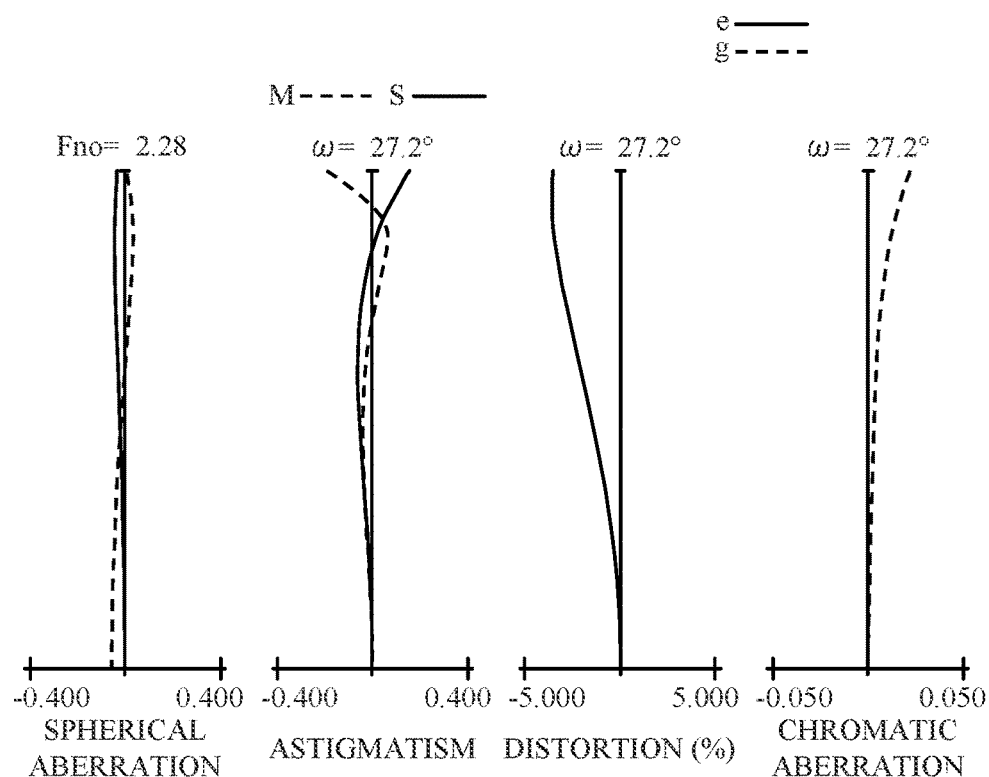
FIGS. 8A and 8B are aberration diagrams at the wide-angle end and intermediate zoom positions in the in-focus state at infinity of the zoom lens according to numerical example 3.
Figure 8B:
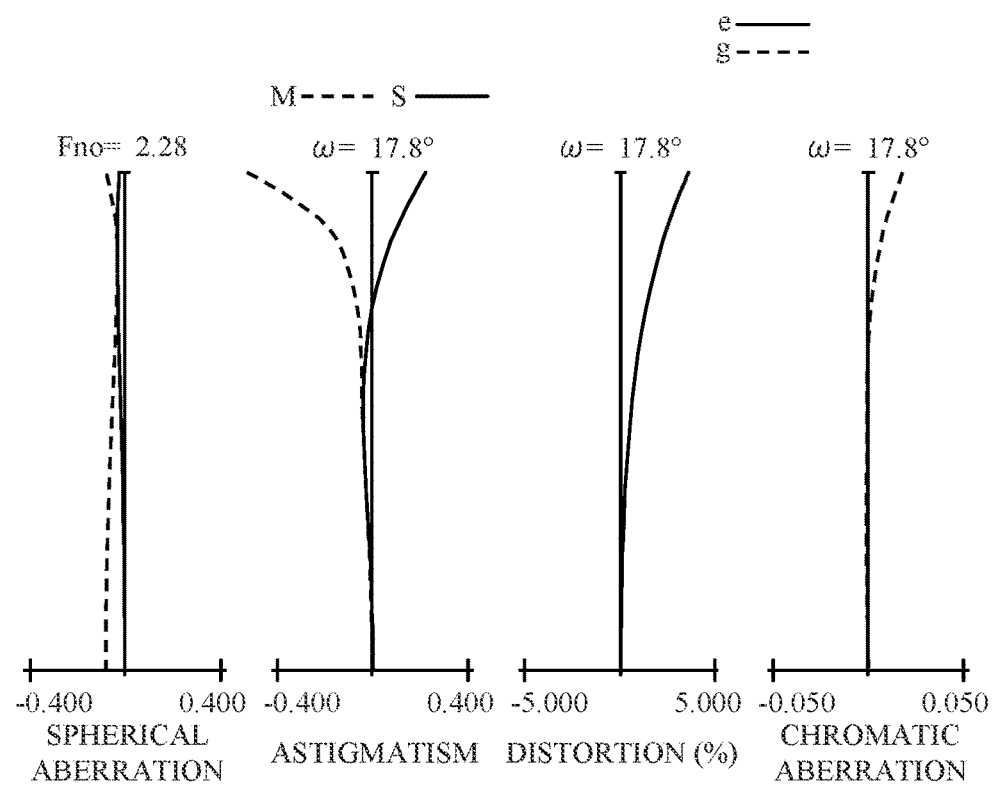
Figure 9:
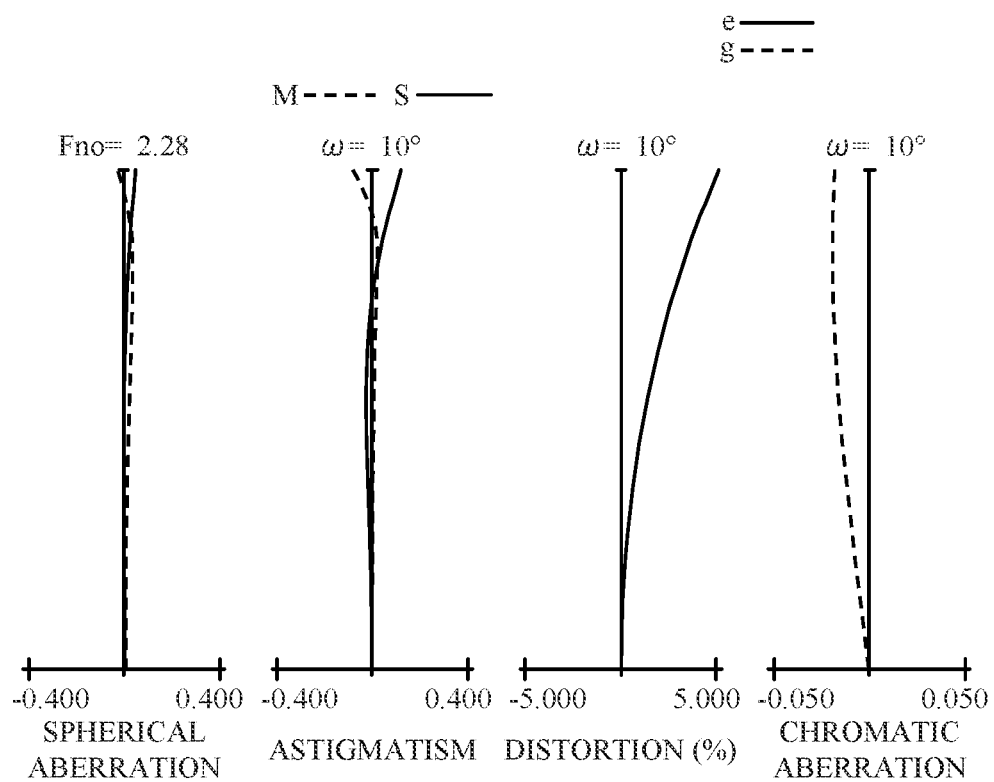
FIG. 9 is an aberration diagram at the telephoto end in the in-focus state at infinity of the zoom lens according to numerical example 3.
Figure 11A:
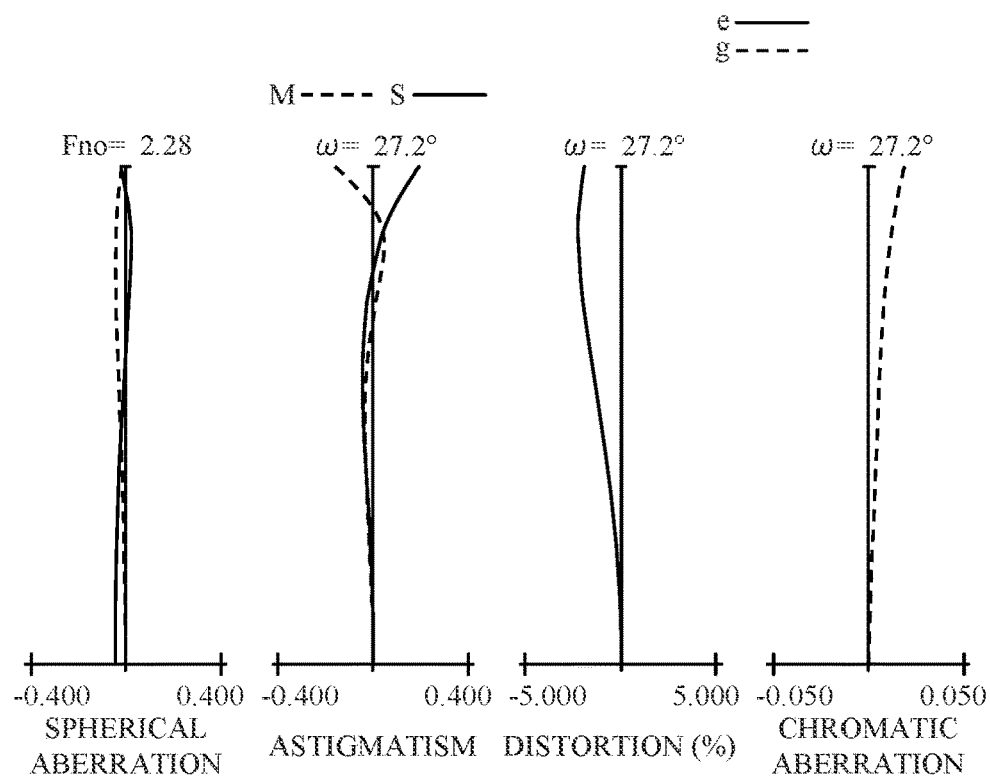
FIGS. 11A and 11B are aberration diagrams at the wide-angle end and intermediate zoom positions in the in-focus state at infinity of the zoom lens according to numerical example 4.
Figure 11B:
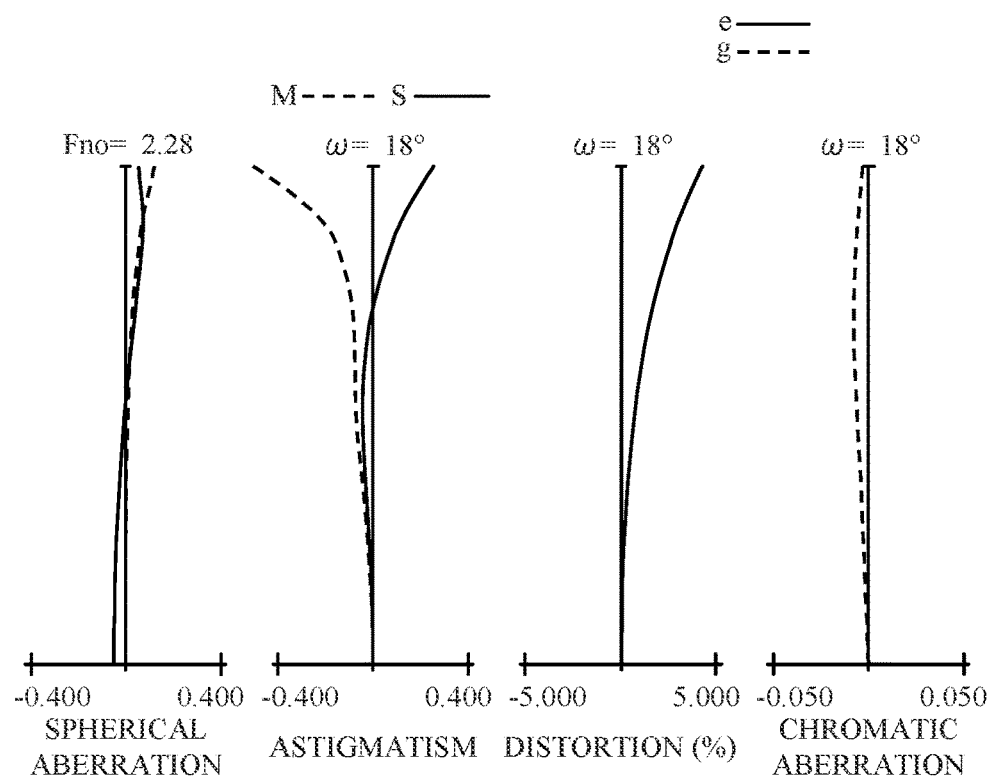
Figure 12:
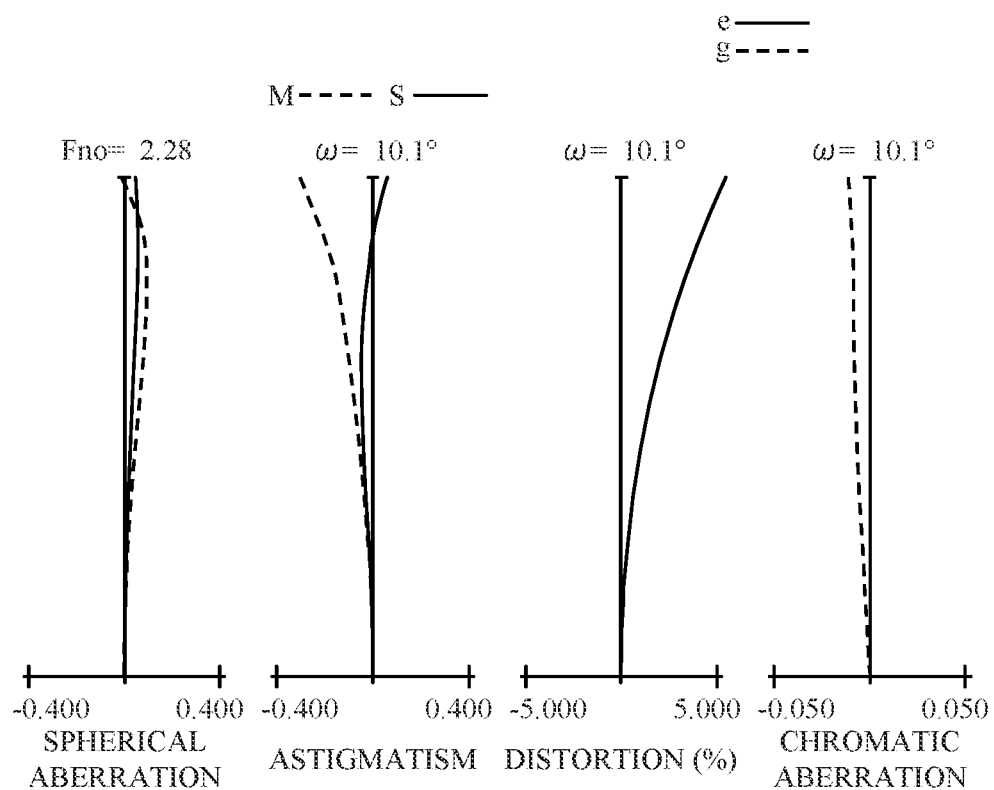
FIG. 12 is an aberration diagram at the telephoto end in the in-focus state at infinity of the zoom lens according to numerical example 4.
Figure 14A:
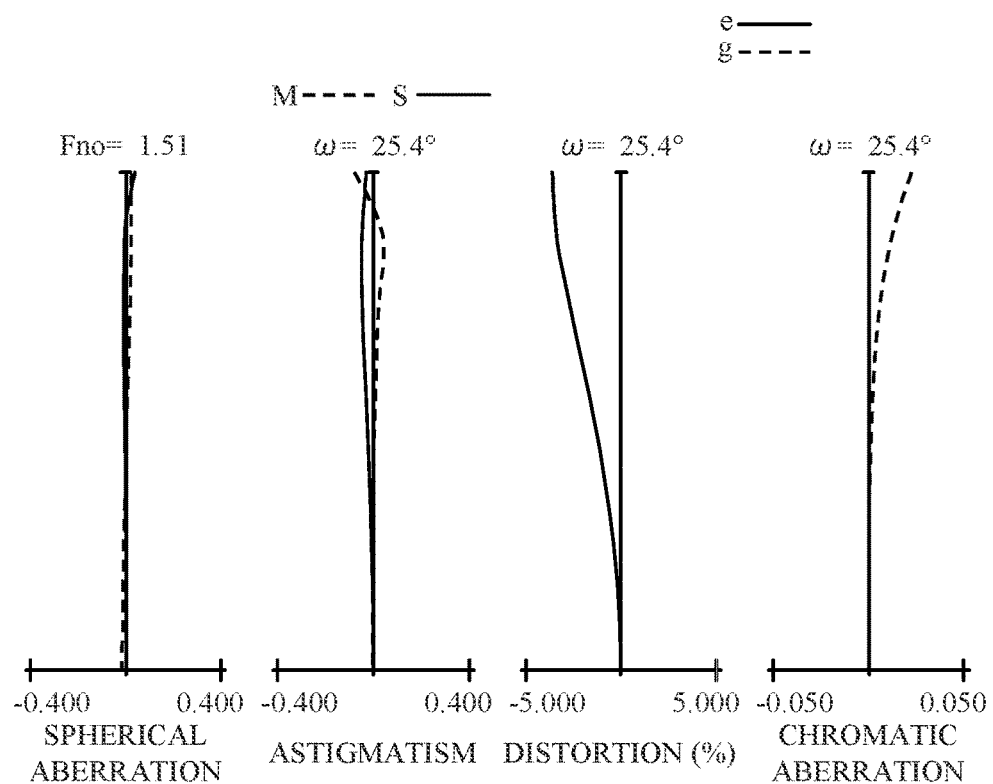
FIGS. 14A and 14B are aberration diagrams at the wide-angle end and intermediate zoom positions in the in-focus state at infinity of the zoom lens according to numerical example 5.
Figure 14B:
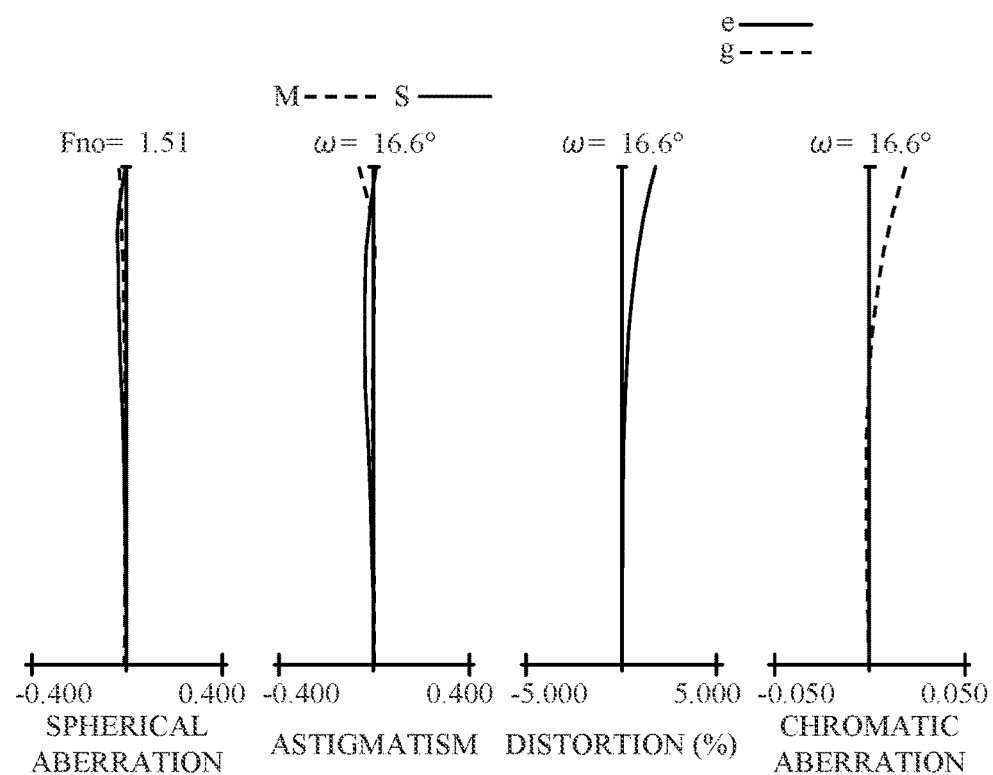
Figure 15:
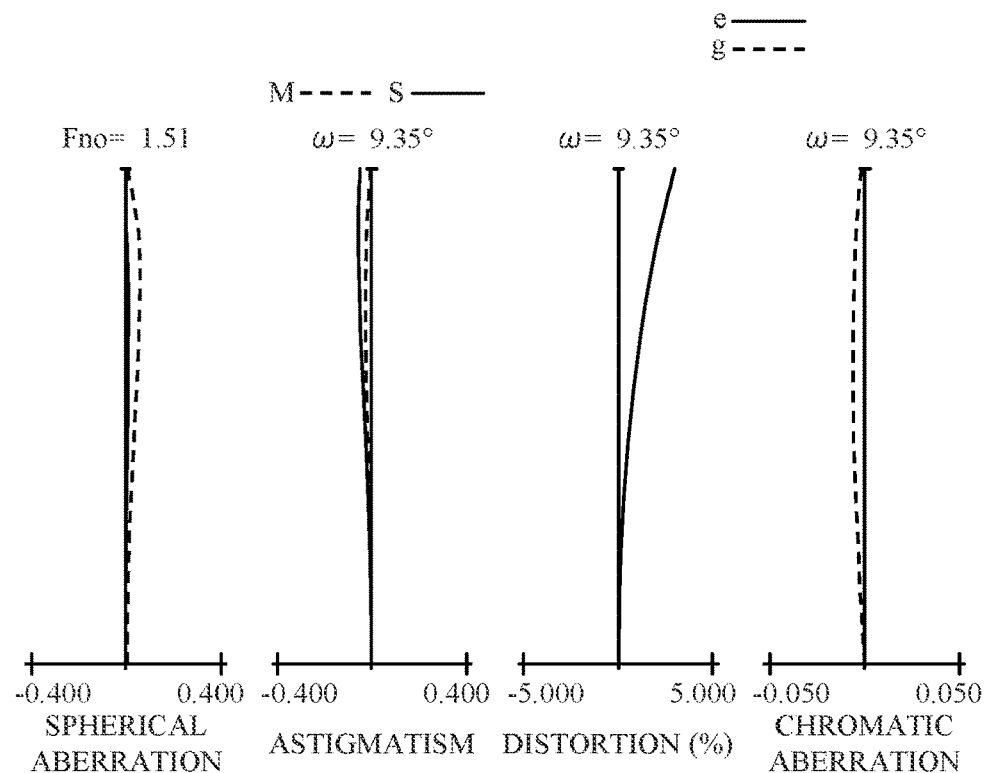
FIG. 15 is an aberration diagram at the telephoto end in the in-focus state at infinity of the zoom lens according to numerical example 5.

FIGS. 8A, 8B, and 9 illustrate longitudinal aberrations at the wide-angle end, intermediate zoom position, and telephoto end in the in-focus state at infinity of the zoom lens according to numerical example 3, respectively. FIGS. 11A, 11B, and 12 illustrate longitudinal aberrations at the wide-angle end, intermediate zoom position, and telephoto end in the in-focus state at infinity of the zoom lens according to numerical example 4, respectively. FIGS. 14A, 14B, and 15 illustrate longitudinal aberrations at the wide-angle end, intermediate zoom position, and telephoto end in the in-focus state at infinity of the zoom lens according to numerical example 5, respectively.

Example 6

Figure 16:
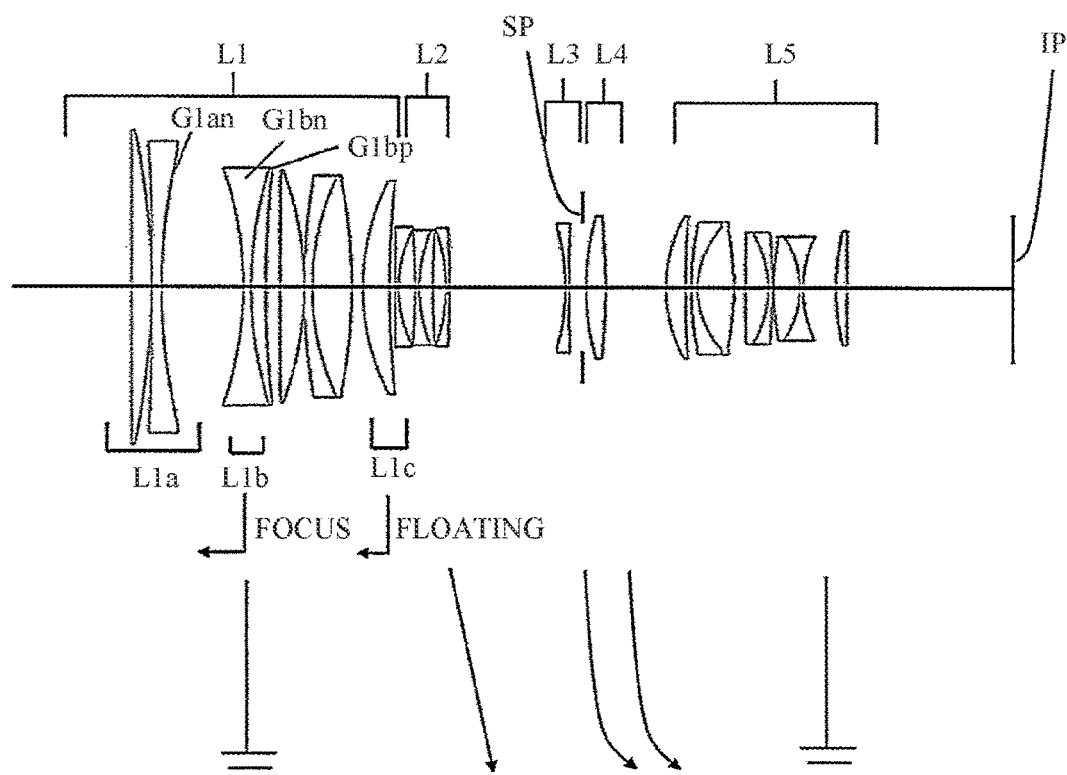
FIG. 16 is a sectional view of a zoom lens according to Example 6 (numerical example 6).

The first lens unit L1 of the zoom lens according to Example 6 (numerical example 6) illustrated in FIG. 16 includes, in order from the object side to the image side, the first negative sub-lens unit L1a that does not move during focusing, the second negative sub-lens unit L1b that moves during focusing, the positive lens unit that does not move during focusing, and the third sub-lens unit L1c that moves on a trajectory different from that of the second sub-lens unit during focusing.

The second sub-lens unit L1b moves toward the object side during focusing from the in-focus state at infinity to the in-focus state on the close end, as indicated by an arrow below the second sub-lens unit L1b in FIG. 16. This configuration shortens the moving amount of the second sub-lens unit L1b during focusing between the in-focus state at infinity and the in-focus state on the close end, and achieves both miniaturization and high optical performance of the zoom lens.

The third sub-lens unit L1c moves toward the object on a trajectory different from that of the second sub-lens unit, as indicated by an arrow below the third sub-lens unit L1c in FIG. 16. This configuration moves the third lens unit on the trajectory different from that of the second sub-lens unit L1b during focusing between the in-focus state at infinity and the in-focus state on the close end, and suppresses changes in the field of view during focusing that occurs at the wide-angle end.

Other configurations are similar to those of the zoom lens according to Example 3.

Table 1 summarizes values of the conditions illustrated by inequalities (1) to (11) according to numerical example 6. Numerical example 6 satisfies the conditions illustrated by inequalities (1) to (11).

Figure 17A:
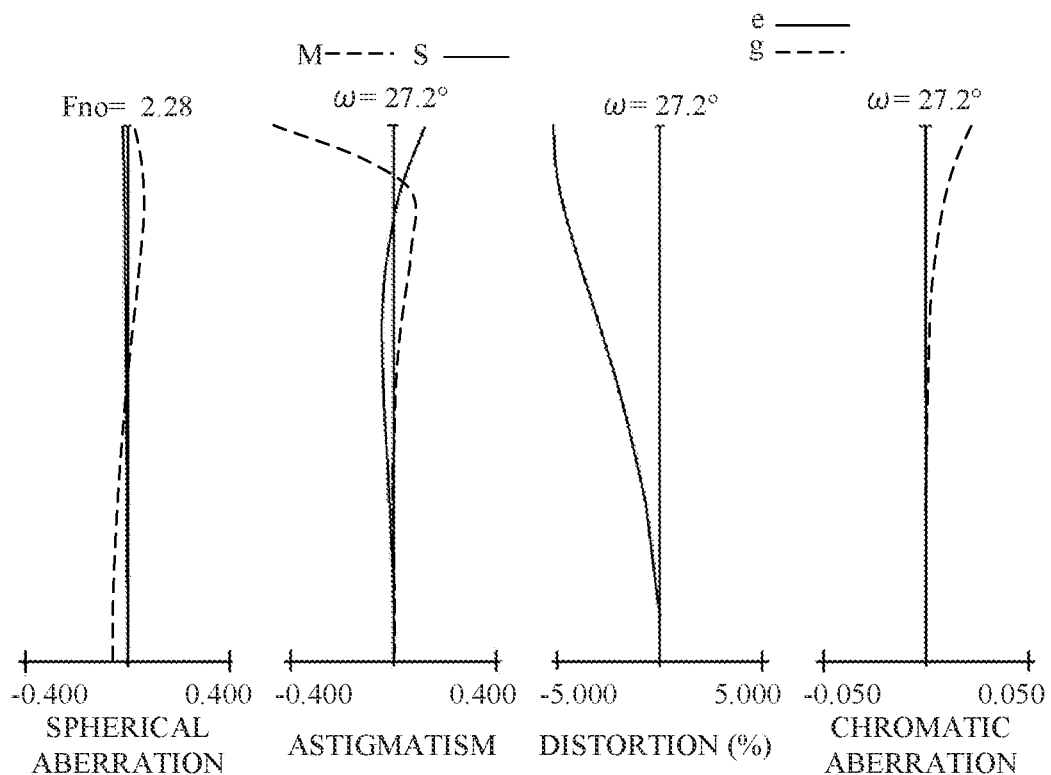
FIGS. 17A and 17B are aberration diagrams at the wide-angle end and intermediate zoom positions in the in-focus state at infinity of the zoom lens according to numerical example 6.
Figure 17B:
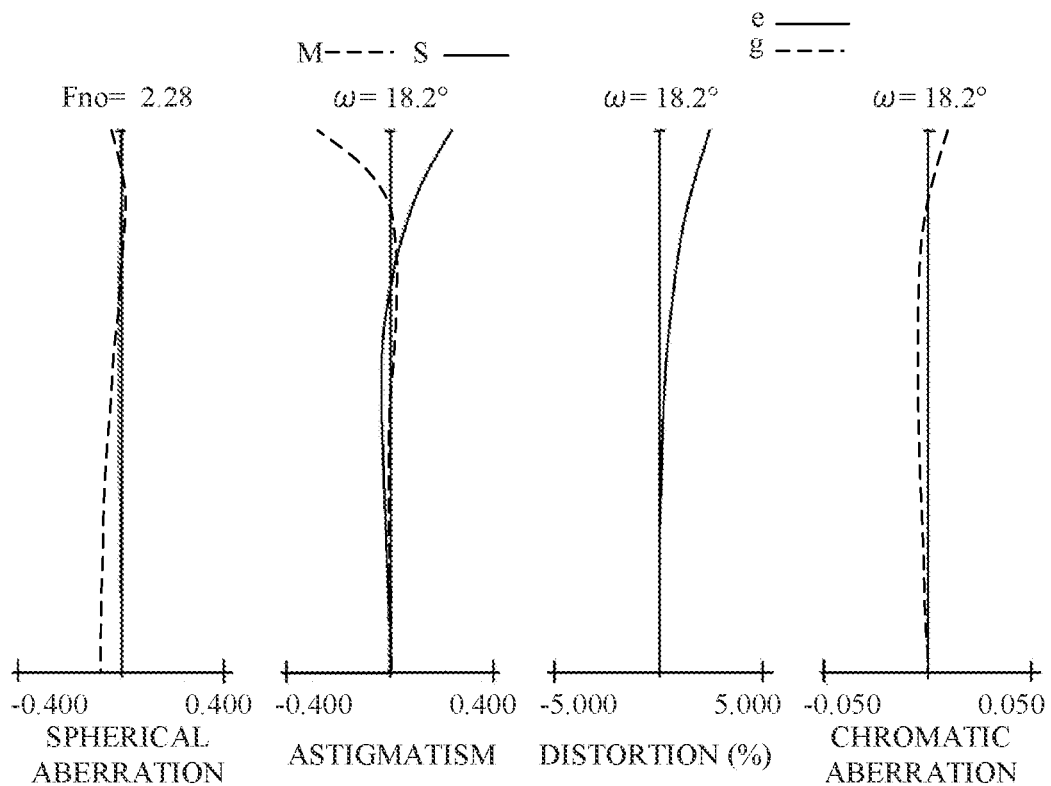
Figure 18:
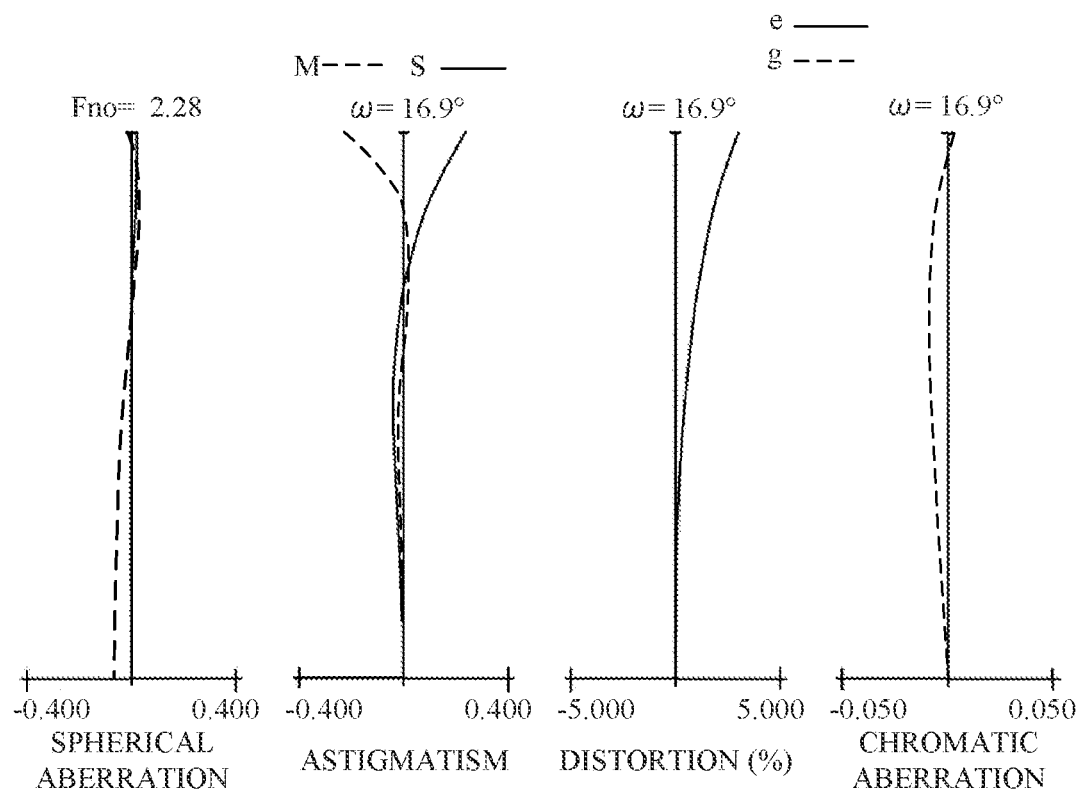
FIG. 18 is an aberration diagram at the telephoto end in the in-focus state at infinity of the zoom lens according to numerical example 6.

FIGS. 17A, 17B, and 18 illustrate longitudinal aberrations at the wide-angle end, intermediate zoom position, and telephoto end in the in-focus state at infinity of the zoom lens according to numerical example 6, respectively.

| NUMERICAL EXAMPLE 1 UNIT: mm | | | | | |
|---|---|---|---|---|---|
| Surface Data | | | | | |
| Surface No. | r | d | nd | vd | |
| 1* | 991.548 | 3.37 | 1.80400 | 46.5 | L1a Starting Surface |
| 2 | 42.088 | 20.25 | | | |
| 3 | −163.489 | 2.70 | 1.80400 | 46.5 | |
| 4 | ∞ | 7.96 | | | |
| 5 | −80.042 | 2.70 | 1.80440 | 39.6 | |
| 6 | −162.452 | 0.27 | | | |
| 7 | 144.276 | 11.07 | 1.85478 | 24.8 | |
| 8 | −168.272 | 14.52 | | | L1a End Surface |
| 9* | −73.990 | 2.83 | 1.80400 | 46.5 | L1b Starting Surface |
| 10 | −123.907 | 4.04 | | | L1b End Surface |
| 11 | 6528.178 | 10.26 | 1.53775 | 74.7 | L1c Starting Surface |
| 12 | −92.110 | 0.27 | | | |
| 13 | 126.599 | 2.70 | 1.85478 | 24.8 | |
| 14 | 61.810 | 19.44 | 1.43875 | 94.7 | |
| 15 | −142.426 | 0.27 | | | |
| 16 | 81.264 | 12.15 | 1.49700 | 81.5 | |
| 17 | −2294.246 | 0.27 | | | |
| 18 | 215.783 | 5.40 | 1.53775 | 74.7 | |
| 19 | 1076.468 | (Variable) | | | L1c End Surface |
| 20 | −1174.973 | 1.25 | 1.59410 | 60.5 | |
| 21 | 50.118 | 4.93 | | | |
| 22 | 44841.950 | 1.25 | 1.80400 | 46.5 | |
| 23 | 43.302 | 5.77 | 1.84666 | 23.8 | |
| 24 | 706.498 | 5.08 | | | |
| 25 | −57.278 | 1.25 | 1.78800 | 47.4 | |
| 26 | −285.305 | (Variable) | | | |
| 27 | −134.322 | 1.40 | 1.49700 | 81.5 | |
| 28 | 408.233 | (Variable) | | | |
| 29 | ∞ | 1.00 | | | |
| 30 | 60.610 | 6.22 | 1.80610 | 40.9 | |
| 31* | −1152.003 | (Variable) | | | |
| 32 | 35.091 | 9.12 | 1.51633 | 64.1 | |
| 33 | 183.068 | 3.50 | | | |
| 34 | 51.347 | 1.30 | 2.00100 | 29.1 | |
| 35 | 23.756 | 12.77 | 1.43875 | 94.7 | |
| 36 | −75.115 | 0.65 | | | |
| 37 | 75.629 | 9.33 | 1.89286 | 20.4 | |
| 38 | −30.826 | 1.30 | 2.00069 | 25.5 | |
| 39 | 325.337 | 0.20 | | | |
| 40 | 112.843 | 1.20 | 2.00069 | 25.5 | |
| 41 | 25.139 | 3.30 | 1.48749 | 70.2 | |
| 42 | 33.640 | 10.03 | | | |
| 43 | 40.128 | 5.68 | 1.55200 | 70.7 | |
| 44 | 199.989 | (Variable) | | | |
| Image Plane | ∞ | | | | |

NUMERICAL EXAMPLE 1
UNIT: mm

Aspheric Data

1st Surface

K = 0.00000e+00    A 4 = 1.14842e−06    A 6 = −1.72159e−10    A 8 = 1.98738e−14

9th Surface

K= 0.00000e+00    A 4 = −2.49108e−07    A 6 = −6.83788e−12    A 8 = 1.95803e−14

31st Surface

K = 0.00000e+00    A 4 = 1.91955e−06    A 6 = 1.03355e−10    A 8 = 5.41766e−14

Various Data
ZOOM RATIO 2.85

|  | WIDE-ANGLE | MIDDLE | TELEPHOTO |
|---|---|---|---|
| focal length: | 24.50 | 37.17 | 69.82 |
| FNO | 2.30 | 2.29 | 2.30 |
| Half Angle of View (°): | 41.45 | 30.20 | 17.22 |
| Image Height | 21.64 | 21.64 | 21.64 |
| Overall lens length | 310.00 | 310.00 | 310.00 |
| BF | 46.38 | 46.38 | 46.38 |
| d19 | 2.91 | 25.41 | 47.91 |
| d26 | 43.82 | 23.44 | 3.05 |
| d28 | 3.66 | 7.77 | 3.18 |
| d31 | 6.24 | 0.02 | 2.50 |
| d44 | 46.38 | 46.38 | 46.38 |

Lens Unit Data

| Lens Unit | Starting Surface | focal length |
|---|---|---|
| 1 | 1 | 52.98 |
| 2 | 20 | −39.32 |
| 3 | 27 | −202.59 |
| 4 | 29 | 71.18 |
| 5 | 32 | 113.11 |

NUMERICAL EXAMPLE 2
UNIT: mm

Surface Data

| Surface No. | r | d | nd | vd | |
|---|---|---|---|---|---|
| 1* | 184.719 | 3.37 | 1.80400 | 46.5 | L1a Starting Surface |
| 2 | 45.744 | 20.25 | | | |
| 3 | −366.231 | 2.70 | 1.80400 | 46.5 | |
| 4 | 126.601 | 7.96 | | | |
| 5 | −284.479 | 2.70 | 1.80440 | 39.6 | |
| 6 | −592.664 | 0.27 | | | |
| 7 | 91.999 | 11.07 | 1.85478 | 24.8 | |
| 8* | −405.950 | 14.52 | | | L1a End Surface |
| 9* | −85.223 | 2.83 | 1.80400 | 46.5 | L1b Starting Surface |
| 10 | −882.526 | 4.04 | | | L1b End Surface |
| 11 | −1470.839 | 10.26 | 1.53775 | 74.7 | L1c Starting Surface |
| 12 | −84.976 | 0.27 | | | |
| 13 | 102.894 | 2.70 | 1.85478 | 24.8 | |
| 14 | 57.867 | 19.44 | 1.43875 | 94.7 | |
| 15 | −165.704 | 0.27 | | | |
| 16 | 95.604 | 12.15 | 1.49700 | 81.5 | |
| 17 | −211.175 | 0.27 | | | |
| 18 | 118.751 | 5.40 | 1.53775 | 74.7 | |
| 19 | 254.808 | (Variable) | | | L1c End Surface |
| 20 | 84.956 | 1.25 | 1.59410 | 60.5 | |
| 21 | 32.489 | 4.61 | | | |
| 22 | 255.100 | 1.25 | 1.80400 | 46.5 | |
| 23 | 75.200 | 1.86 | 1.84666 | 23.8 | |
| 24 | 95.228 | 6.06 | | | |
| 25 | −37.541 | 1.25 | 1.78800 | 47.4 | |
| 26 | 242.282 | (Variable) | | | |
| 27 | 1209.392 | 3.04 | 1.92286 | 20.9 | |
| 28 | −158.433 | (Variable) | | | |
| 29(SP) | ∞ | 1.00 | | | |

-continued

NUMERICAL EXAMPLE 2
UNIT: mm

| | | | | |
|---|---|---|---|---|
| 30 | 91.600 | 5.62 | 1.80610 | 40.9 |
| 31* | −244.040 | (Variable) | | |
| 32 | 35.125 | 7.92 | 1.51633 | 64.1 |
| 33 | 109.970 | 6.27 | | |
| 34 | 41.782 | 1.30 | 2.00100 | 29.1 |
| 35 | 24.078 | 11.71 | 1.43875 | 94.7 |
| 36 | −93.871 | 0.65 | | |
| 37 | 77.337 | 8.04 | 1.89286 | 20.4 |
| 38 | −32.772 | 1.30 | 2.00069 | 25.5 |
| 39 | −393.557 | 2.16 | | |
| 40 | −80.548 | 1.20 | 2.00069 | 25.5 |
| 41 | 31.303 | 3.87 | 1.48749 | 70.2 |
| 42 | 78.976 | 2.10 | | |
| 43 | 141.146 | 4.40 | 1.55200 | 70.7 |
| 44 | −64.370 | (Variable) | | |
| Image Plane | ∞ | | | |

Aspheric Data

1st Surface

K = 0.00000e+00 A 4 = 2.50833e−07 A 6 = 5.57017e−11 A 8 = −3.55786e−15

9th Surface

K = 0.00000e+00 A 4 = −1.69154e−07 A 6 = −7.03189e−12 A 8 = 9.23468e−15

31st Surface

K = 0.00000e+00 A 4 = 7.93532e−07 A 6 = 9.3705Se−11 A 8 = 5.37078e−14

Various Data

ZOOM RATIO  2.85

| | WIDE-ANGLE | MIDDLE | TELEPHOTO |
|---|---|---|---|
| focal length: | 24.50 | 36.65 | 69.83 |
| FNO | 2.30 | 2.29 | 2.30 |
| Half Angle of View (°): | 41.45 | 30.56 | 17.21 |
| Image Height | 21.64 | 21.64 | 21.64 |
| Overall lens length | 310.00 | 310.00 | 310.00 |
| BF | 49.50 | 49.50 | 49.50 |
| d19 | 4.15 | 26.65 | 49.15 |
| d26 | 2.00 | 6.01 | 10.02 |
| d28 | 36.84 | 24.50 | 1.49 |

-continued

| | | | |
|---|---|---|---|
| d31 | 20.19 | 6.01 | 2.50 |
| d44 | 49.50 | 49.50 | 49.50 |

Lens Unit Data

| Lens Unit | Starting Surface | focal length |
|---|---|---|
| 1 | 1 | 56.08 |
| 2 | 20 | −22.15 |
| 3 | 27 | 150.27 |
| 4 | 29 | 82.77 |
| 5 | 32 | 104.03 |

NUMERICAL EXAMPLE 3
UNIT: mm

Surface Data

| Surface No. | r | d | nd | vd | |
|---|---|---|---|---|---|
| 1 | 4420.000 | 6.34 | 1.58913 | 61.1 | L1a Starting Surface |
| 2 | −249.930 | 0.20 | | | |
| 3 | −1268.823 | 2.90 | 1.69680 | 55.5 | |
| 4 | 151.210 | 26.96 | | | L1a End Surface |
| 5 | −122.492 | 2.35 | 1.64000 | 60.1 | L1b Starting Surface |
| 6 | 116.019 | 4.50 | 1.84669 | 23.9 | |
| 7 | 270.082 | 4.05 | | | L1b End Surface |
| 8 | 437.925 | 8.90 | 1.49700 | 81.5 | L1c Starting Surface |
| 9 | −113.504 | 0.30 | | | |
| 10 | 184.954 | 2.30 | 1.84669 | 23.9 | |
| 11 | 81.804 | 12.44 | 1.49700 | 81.5 | |
| 12 | −199.182 | 0.20 | | | |
| 13 | 76.238 | 9.46 | 1.71300 | 53.9 | |
| 14 | 365.206 | (Variable) | | | L1c End Surface |
| 15 | 1260.324 | 1.30 | 1.53775 | 74.7 | |
| 16 | 43.043 | 4.54 | | | |
| 17 | −694.022 | 1.20 | 1.65412 | 39.7 | |

NUMERICAL EXAMPLE 3
UNIT: mm

| | | | | |
|---|---|---|---|---|
| 18 | 39.942 | 4.33 | 1.80808 | 22.7 |
| 19 | 120.907 | 5.00 | | |
| 20 | −51.452 | 1.30 | 1.56883 | 56.4 |
| 21 | −342.666 | (Variable) | | |
| 22 | −73.916 | 1.40 | 1.43875 | 94.7 |
| 23 | 2437.000 | (Variable) | | |
| 24(SP) | ∞ | 1.41 | | |
| 25 | 85.661 | 6.28 | 1.89190 | 37.1 |
| 26* | −191.502 | (Variable) | | |
| 27 | 45.603 | 6.39 | 1.71300 | 53.9 |
| 28 | 278.988 | 1.88 | | |
| 29 | 104.458 | 2.00 | 1.85478 | 24.8 |
| 30 | 28.971 | 11.39 | 1.43875 | 94.7 |
| 31 | −113.841 | 3.61 | | |
| 32 | 381.703 | 7.57 | 1.62041 | 60.3 |
| 33 | −33.958 | 1.30 | 1.80000 | 29.8 |
| 34 | −178.262 | 0.49 | | |
| 35 | 114.848 | 7.94 | 1.89286 | 20.4 |
| 36 | −30.923 | 1.20 | 1.85025 | 30.1 |
| 37 | 38.569 | 10.34 | | |
| 38 | 76.230 | 3.33 | 1.83481 | 42.7 |
| 39 | 1349.526 | (Variable) | | |
| Image Plane | ∞ | | | |

Aspheric Data
26th Surface

K = 0.00000e+00 A 4 = 1.21740e−06
A 6 = −3.38308e−11 A 8 = −6.88824e−14

Various Data

ZOOM RATIO 2.89

| | WIDE-ANGLE | MIDDLE | TELEPHOTO |
|---|---|---|---|
| focal length: | 45.23 | 72.47 | 130.93 |
| FNO | 2.28 | 2.28 | 2.28 |
| Half Angle of View (°): | 27.16 | 17.75 | 10.05 |
| Image Height | 23.20 | 23.20 | 23.20 |
| Overall lens length | 282.58 | 282.58 | 282.58 |
| BF | 53.60 | 53.60 | 53.60 |
| d14 | 3.68 | 29.19 | 54.70 |
| d21 | 37.27 | 9.96 | 4.81 |
| d23 | 3.02 | 10.88 | 2.61 |
| d26 | 19.90 | 13.85 | 1.75 |
| d39 | 53.60 | 53.60 | 53.60 |

Lens Unit Data

| Lens Unit | Starting Surface | focal length |
|---|---|---|
| 1 | 1 | 108.94 |
| 2 | 15 | −36.80 |
| 3 | 22 | −163.07 |
| 4 | 24 | 66.65 |
| 5 | 27 | 96.99 |

NUMERICAL EXAMPLE 4
UNIT: mm

Surface Data

| Surface No. | r | d | nd | vd | |
|---|---|---|---|---|---|
| 1 | 1922.507 | 5.86 | 1.58913 | 61.1 | L1a Starting Surface |
| 2 | −286.210 | 0.20 | | | |
| 3 | 498.754 | 2.90 | 1.69680 | 55.5 | |
| 4 | 104.455 | 28.24 | | | L1a End Surface |
| 5 | −126.974 | 2.35 | 1.88300 | 40.8 | L1b Starting Surface |
| 6 | 296.167 | 3.56 | 1.95906 | 17.5 | |
| 7 | −10606.900 | 4.05 | | | L1b End Surface |
| 8 | −1724.570 | 8.09 | 1.49700 | 81.5 | L1c Starting Surface |
| 9 | −101.685 | 0.30 | | | |
| 10 | 158.900 | 2.30 | 1.84669 | 23.9 | |
| 11 | 85.064 | 10.41 | 1.49700 | 81.5 | |
| 12 | −249.215 | 0.20 | | | |
| 13 | 78.263 | 10.96 | 1.71300 | 53.9 | |
| 14 | 629.155 | (Variable) | | | L1c End Surface |
| 15 | −407.678 | 1.30 | 1.53775 | 74.7 | |
| 16 | 44.750 | 4.10 | | | |
| 17 | −1003.011 | 1.20 | 1.65412 | 39.7 | |

-continued

NUMERICAL EXAMPLE 4
UNIT: mm

| | | | | |
|---|---|---|---|---|
| 18 | 41.000 | 5.86 | 1.80808 | 22.7 |
| 19 | 117.400 | 5.08 | | |
| 20 | −50.491 | 1.30 | 1.56883 | 56.4 |
| 21 | −181.162 | (Variable) | | |
| 22 | −70.107 | 1.40 | 1.43875 | 94.7 |
| 23 | 3927.004 | (Variable) | | |
| 24(SP) | ∞ | 2.40 | | |
| 25 | 91.798 | 7.51 | 1.89190 | 37.1 |
| 26* | −158.716 | (Variable) | | |
| 27 | 45.603 | 6.39 | 1.71300 | 53.9 |
| 28 | 278.988 | 1.88 | | |
| 29 | 104.458 | 2.00 | 1.85478 | 24.8 |
| 30 | 28.971 | 11.39 | 1.43875 | 94.7 |
| 31 | −113.841 | 3.61 | | |
| 32 | 381.703 | 7.57 | 1.62041 | 60.3 |
| 33 | −33.958 | 1.30 | 1.80000 | 29.8 |
| 34 | −178.262 | 0.49 | | |
| 35 | 114.848 | 7.94 | 1.89286 | 20.4 |
| 36 | −30.923 | 1.20 | 1.85025 | 30.1 |
| 37 | 38.569 | 10.34 | | |
| 38 | 76.230 | 3.33 | 1.83481 | 42.7 |
| 39 | 526.280 | (Variable) | | |
| Image Plane | ∞ | | | |

Aspheric Data
26th Surface

K = 0.00000e+00 A 4 = 1.12624e−06 A 6 = −1.78417e−11 A 8 = −6.44693e−14

Various Data

ZOOM RATIO    2.87

| | WIDE-ANGLE | MIDDLE | TELEPHOTO |
|---|---|---|---|
| focal length: | 45.22 | 71.35 | 129.97 |
| FNO | 2.28 | 2.28 | 2.28 |
| Half Angle of View (°): | 27.16 | 18.01 | 10.12 |
| Image Height | 23.20 | 23.20 | 23.20 |
| Overall lens length | 283.25 | 283.25 | 283.25 |
| BF | 53.60 | 53.60 | 53.60 |
| d14 | 3.68 | 29.08 | 54.47 |
| d21 | 36.16 | 12.42 | 4.27 |
| d23 | 3.05 | 9.14 | 2.40 |
| d26 | 19.75 | 12.00 | 1.49 |
| d39 | 53.60 | 53.60 | 53.60 |

Lens Unit Data

| Lens Unit | Starting Surface | focal length |
|---|---|---|
| 1 | 1 | 107.40 |
| 2 | 15 | −36.74 |
| 3 | 22 | −156.57 |
| 4 | 24 | 65.73 |
| 5 | 27 | 102.59 |

NUMERICAL EXAMPLE 5
UNIT: mm

Surface Data

| Surface No. | r | d | nd | vd | |
|---|---|---|---|---|---|
| 1 | 516.540 | 9.64 | 1.54072 | 47.2 | L1a Starting Surface |
| 2 | −222.109 | 0.20 | | | |
| 3 | −373.732 | 3.00 | 1.64000 | 60.1 | |
| 4 | 125.124 | 29.41 | | | L1a End Surface |
| 5 | −132.505 | 2.40 | 1.77250 | 49.6 | L1b Starting Surface |
| 6 | 263.081 | 3.97 | 1.92286 | 18.9 | |
| 7 | 1651.195 | 1.37 | | | L1b End Surface |
| 8 | 581.972 | 7.62 | 1.71300 | 53.9 | L1c Starting Surface |
| 9 | −138.468 | 0.30 | | | |
| 10 | 195.533 | 2.50 | 1.85478 | 24.8 | |
| 11 | 77.806 | 12.48 | 1.43875 | 94.7 | |
| 12 | −241.835 | 0.20 | | | |
| 13 | 75.207 | 9.54 | 1.71300 | 53.9 | |
| 14 | 548.991 | (Variable) | | | L1c End Surface |
| 15 | 201.621 | 1.50 | 1.43875 | 94.7 | |
| 16 | 38.116 | 5.50 | | | |
| 17 | −764.821 | 1.50 | 1.65412 | 39.7 | |
| 18 | 40.468 | 4.93 | 1.85478 | 24.8 | |

-continued

NUMERICAL EXAMPLE 5
UNIT: mm

| | | | | |
|---|---|---|---|---|
| 19 | 119.528 | 4.49 | | |
| 20 | -62.581 | 1.50 | 1.88300 | 40.8 |
| 21 | -170.328 | (Variable) | | |
| 22 | -63.927 | 1.50 | 1.49700 | 81.5 |
| 23 | 291.433 | (Variable) | | |
| 24(SP) | ∞ | 1.38 | | |
| 25 | 86.002 | 6.61 | 1.95375 | 32.3 |
| 26* | -214.142 | (Variable) | | |
| 27 | 68.275 | 1.50 | 1.85478 | 24.8 |
| 28 | 29.252 | 11.55 | 1.43875 | 94.7 |
| 29 | -1316.992 | 0.20 | | |
| 30 | 136.410 | 7.78 | 1.53775 | 74.7 |
| 31 | -65.565 | 3.18 | | |
| 32 | -41.581 | 1.50 | 1.67983 | 31.6 |
| 33 | 50.290 | 15.34 | 1.85721 | 42.6 |
| 34 | -53.432 | 0.19 | | |
| 35 | 51.610 | 10.90 | 1.89286 | 20.4 |
| 36 | -52.319 | 1.30 | 1.85478 | 24.8 |
| 37 | 29.154 | 2.61 | | |
| 38 | 45.307 | 5.31 | 1.51815 | 78.9 |
| 39 | 242.768 | (Variable) | | |
| Image Plane | ∞ | | | |

Aspheric Data

26th Surface $K = 0.00000e+00$ $A4 = 1.15159e-06$ $A6 = -1.41454e-10$ $A8 = 8.77973e-14$ Various Data

ZOOM RATIO 2.88

| | WIDE-ANGLE | MIDDLE | TELEPHOTO |
|---|---|---|---|
| focal length: | 31.20 | 49.80 | 89.85 |
| FNO | 1.51 | 1.51 | 1.51 |
| Half Angle of View (°): | 25.38 | 16.55 | 9.35 |
| Image Height | 14.80 | 14.80 | 14.80 |
| Overall lens length | 280.89 | 280.89 | 280.89 |
| BF | 42.40 | 42.40 | 42.40 |
| d14 | 0.80 | 28.19 | 55.59 |
| d21 | 29.28 | 8.15 | 3.94 |
| d23 | 9.29 | 11.26 | 2.12 |
| d26 | 26.24 | 18.00 | 3.95 |
| d39 | 42.40 | 42.40 | 42.40 |

Lens Unit Data

| Lens Unit | Starting Surface | focal length |
|---|---|---|
| 1 | 1 | 115.26 |
| 2 | 15 | -44.22 |
| 3 | 22 | -105.03 |
| 4 | 24 | 64.56 |
| 5 | 27 | 62.46 |

NUMERICAL EXAMPLE 6
UNIT: mm

Surface Data

| Surface No. | r | d | nd | vd |
|---|---|---|---|---|
| 1 | 7672.555 | 6.65 | 1.58913 | 61.1 |
| 2 | -225.147 | 0.20 | | |
| 3 | -767.344 | 2.90 | 1.69680 | 55.5 |

-continued

NUMERICAL EXAMPLE 6
UNIT: mm

| | | | | |
|---|---|---|---|---|
| 4 | 198.409 | 25.92 | | |
| 5 | -112.010 | 2.35 | 1.64000 | 60.1 |
| 6 | 123.220 | 4.60 | 1.84669 | 23.9 |
| 7 | 353.607 | 4.38 | | |
| 8 | 5064.449 | 7.51 | 1.49700 | 81.5 |
| 9 | -109.123 | 0.30 | | |
| 10 | 217.899 | 2.30 | 1.84669 | 23.9 |
| 11 | 84.173 | 12.63 | 1.49700 | 81.5 |
| 12 | -168.758 | 3.49 | | |
| 13 | 74.875 | 8.75 | 1.71300 | 53.9 |
| 14 | 392.574 | (Variable) | | |
| 15 | -7053.255 | 1.30 | 1.53775 | 74.7 |
| 16 | 43.049 | 5.32 | | |
| 17 | -171.199 | 1.20 | 1.65412 | 39.7 |
| 18 | 47.388 | 4.43 | 1.80808 | 22.7 |
| 19 | 236.909 | 4.09 | | |
| 20 | -55.824 | 1.30 | 1.56883 | 56.4 |
| 21 | -330.848 | (Variable) | | |
| 22 | -74.569 | 1.40 | 1.43875 | 94.7 |
| 23 | 1960.366 | (Variable) | | |
| 24(SP) | ∞ | 1.42 | | |
| 25 | 87.533 | 6.00 | 1.89190 | 37.1 |
| 26* | -186.364 | (Variable) | | |
| 27 | 45.603 | 6.39 | 1.71300 | 53.9 |
| 28 | 278.988 | 1.88 | | |
| 29 | 104.458 | 2.00 | 1.85478 | 24.8 |
| 30 | 28.971 | 11.39 | 1.43875 | 94.7 |
| 31 | -113.841 | 3.61 | | |
| 32 | 381.703 | 7.57 | 1.62041 | 60.3 |
| 33 | -33.958 | 1.30 | 1.80000 | 29.8 |
| 34 | -178.262 | 0.49 | | |
| 35 | 114.848 | 7.94 | 1.89286 | 20.4 |
| 36 | -30.923 | 1.20 | 1.85025 | 30.1 |
| 37 | 38.569 | 10.34 | | |
| 38 | 76.230 | 3.33 | 1.83481 | 42.7 |
| 39 | 848.576 | (Variable) | | |
| Image Plane | ∞ | | | |

-continued

NUMERICAL EXAMPLE 6
UNIT: mm

Aspheric Data

26th Surface

K = 0.00000e+00 A 4 = 1.17356e−06 A 6 = −2.93279e−11 A 8 = −7.86095e−14

Various Data

ZOOM RATIO 2.90

|  | WIDE-ANGLE | MIDDLE | TELEPHOTO |
| --- | --- | --- | --- |
| focal length: | 45.23 | 70.57 | 130.93 |
| FNO | 2.28 | 2.28 | 2.28 |
| Half Angle of View (°) | 27.16 | 18.20 | 10.05 |
| Image Height | 23.20 | 23.20 | 23.20 |
| Overall lens length | 280.19 | 280.19 | 280.19 |
| BF | 52.91 | 52.91 | 52.91 |
| d14 | 1.49 | 25.89 | 52.41 |
| d21 | 36.68 | 11.42 | 4.68 |
| d23 | 4.01 | 11.02 | 2.90 |
| d26 | 19.22 | 13.07 | 1.41 |
| d39 | 52.91 | 52.91 | 52.91 |

Lens Unit Data

| Lens Unit | Starting Surface | focal length |
| --- | --- | --- |
| 1 | 1 | 108.84 |
| 2 | 15 | −37.13 |
| 3 | 22 | −163.28 |
| 4 | 24 | 67.05 |
| 5 | 27 | 99.03 |

TABLE 1

|  | Ex.1 | Ex 2 | Ex3 | Ex4 | Ex.5 | Ex.6 |
| --- | --- | --- | --- | --- | --- | --- |
| Inequality (1) | 3.20 | 1.00 | 0.40 | 0.43 | 0.57 | 0.27 |
| Inequality (2) | 46.50 | 46.50 | 60.10 | 40.80 | 49.60 | 60.08 |
| Inequality (3) | 0.85 | 0.48 | 0.17 | 0.19 | 0.22 | 0.22 |
| Inequality (4) | 46.53 | 46.53 | 55.53 | 55.53 | 60.08 | 55.53 |
| Inequality (5) | 0.73 | 0.48 | 0.29 | 0.31 | 0.38 | −5.34 |
| Inequality (6) | 0.62 | 0.37 | 0.27 | 0.29 | 0.34 | 0.20 |
| Inequality (7) | −1.18 | −1.30 | −1.06 | −1.07 | −1.11 | 0.00 |
| Inequality (8) | 0.74 | 0.39 | 0.34 | 0.34 | 0.38 | −0.34 |
| Inequality (9) | −0.35 | 0.55 | −0.41 | −0.42 | −0.62 | −0.41 |
| Inequality (10) | 0.08 | 0.36 | 0.34 | 0.34 | 0.53 | 0.34 |
| Inequality (11) | — | — | 23.86 | 17.47 | 18.90 | 23.86 |
| f1a | −72.93 | −116.82 | −375.97 | −348.07 | −302.55 | −580.97 |
| f1b | −233.19 | −116.82 | −151.15 | −151.16 | −171.58 | −154.81 |
| ν1bn | 46.50 | 46.50 | 60.10 | 40.80 | 49.60 | 60.08 |
| f1c | 62.31 | 55.71 | 65.64 | 64.72 | 67.18 | 127.73 |
| ν1an | 46.53 | 46.53 | 55.53 | 55.53 | 60.08 | 55.53 |
| f1 | 52.98 | 56.08 | 108.94 | 107.40 | 115.26 | 108.84 |
| $\beta$1b | 0.62 | 0.37 | 0.27 | 0.29 | 0.34 | 0.20 |
| $\beta$1c | −1.18 | −1.30 | −1.06 | −1.07 | −1.11 | 0.00 |
| f2 | −39.32 | −22.15 | −36.80 | −36.74 | −44.22 | −37.13 |
| f3 | −202.59 | 150.27 | −163.07 | −156.57 | −105.03 | −163.28 |
| f4 | 71.18 | 82.77 | 66.65 | 65.73 | 64.56 | 67.05 |
| Lspt-Lspw | 3.74 | 17.69 | 18.15 | 18.26 | 22.28 | 17.81 |
| skw | 46.38 | 49.50 | 53.60 | 53.60 | 42.40 | 52.91 |
| ν1bp | — | — | 23.86 | 17.47 | 18.90 | 23.86 |

Figure 19:
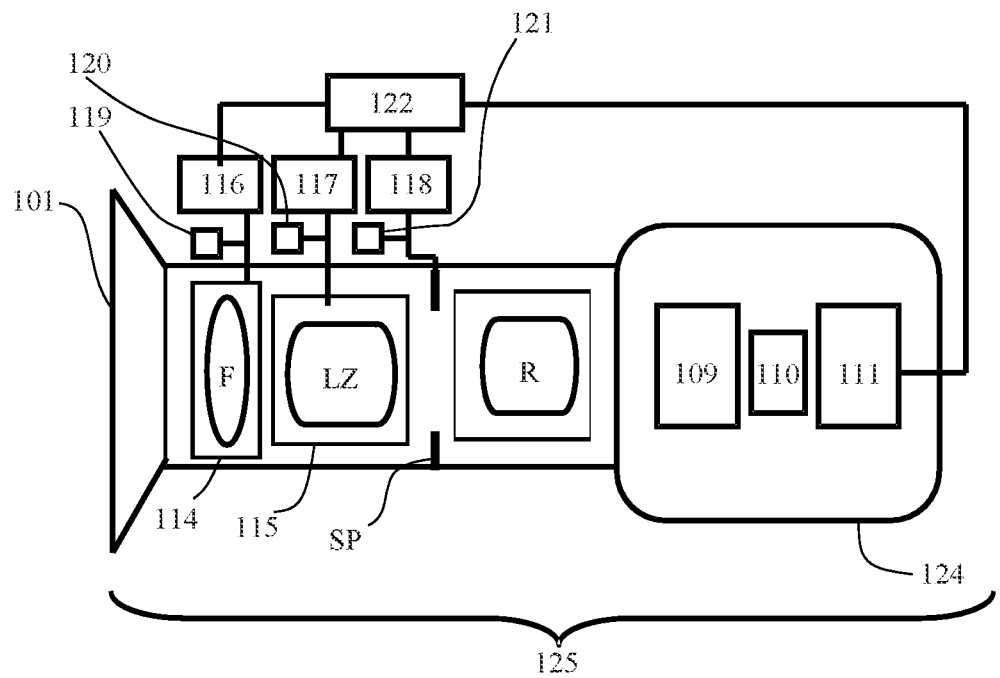
FIG. 19 illustrates an image pickup apparatus using the zoom lens according to any one of Examples 1 to 6.

FIG. 19 illustrates a configuration of an imaging system 125 using the zoom lens according to any one of Examples 1 to 6 as an imaging optical system. Reference numeral 101 denotes the zoom lens according to any one of Examples 1 to 6. Reference numeral 124 denotes a camera body as an image pickup apparatus. The zoom lens 101 is attachable to and detachable (interchangeable) from the camera body 124.

The zoom lens 101 includes a first lens unit F, a zooming unit LZ, and an imaging lens unit R. The first lens unit F includes first and third sub-lens units each of which does not move during focusing and a second sub-lens unit that moves during focusing, as described in each example. The zooming unit LZ includes at least three moving units that move during zooming. An aperture stop SP is disposed between the zooming unit LZ and the imaging lens unit R. The zoom lens 101 includes driving mechanisms 114 and 115 such as helicoids and cams for driving the second sub-lens unit and the zooming unit LZ in the optical axis direction.

The zoom lens 101 includes electric actuators (motors, etc.) 116, 117, and 118 that drive the driving mechanisms 114 and 115 and the aperture stop SP, and a control unit 122 that controls these electric actuators. The positions of the lens units constituting the second sub-lens unit and the zooming unit LZ, and the aperture diameter of the aperture stop SP are detected by detectors 119, 120, and 121 such as encoders, potentiometers, or photosensors, and the electric actuators 116, 117, and 118 are controlled by the control unit 122 based on these detection results.

The camera body 124 is provided with a glass block 109 such as an optical filter, and a solid-state image sensor 110, such as a CCD sensor and a CMOS sensor, that captures an object image formed by the zoom lens 101 (captures an object via an imaging optical system).

Imaging using the zoom lens according to each example in this way can provide a well captured image.

Each of the above examples can provide, for example, a zoom lens beneficial in a small and lightweight structure, high specification, and high optical performance over the entire zoom range.

While the disclosure has been described with reference to exemplary examples, it is to be understood that the disclosure is not limited to the disclosed exemplary examples. The scope of the following claims is to be accorded the broadest interpretation so as to encompass all such modifications and equivalent structures and functions.

This application claims the benefit of Japanese Patent Application No. 2021-198652, filed on Dec. 7, 2021, which is hereby incorporated by reference herein in its entirety.

What is claimed is:

1. A zoom lens comprising in order from an object side to an image side:
   a first lens unit that has a positive refractive power and does not move for zooming;
   a second lens unit that has a negative refractive power and moves in zooming;
   a middle group that has at least two lens units that move in zooming; and
   a final lens unit that has a positive refractive power, is disposed closest to the image side, and does not move for zooming,
   wherein the zoom lens further comprises an aperture stop that is disposed between a surface closest to the image side of the second lens unit and a surface closest to the object side of the final lens unit, and moves in zooming,
   wherein each distance between adjacent lens groups changes in zooming,
   wherein the first lens unit includes, in order from the object side to the image side,
   a first sub-lens unit that has a negative refractive power and does not move for focusing;

a second sub-lens unit that has a negative refractive power and moves for focusing; and
a third sub-lens unit having a positive refractive power, wherein a distance between the second sub-lens unit and the third sub-lens unit changes for focusing,
wherein the second sub-lens unit includes a negative lens, and
wherein following inequalities are satisfied:

$$0.2 \le f1b/f1a \le 3.2$$
$$35 \le \nu1bn \le 100$$
$$0.3 \le |f2/f1| \le 0.8$$
$$0.08 \le (Lspt - Lspw)/Skw \le 0.80$$

where f1a is a focal length of the first sub-lens unit, f1b is a focal length of the second sub-lens unit, vbn is an Abbe number with respect to d-line of the negative lens in the second sub-lens unit, f1 is a focal length of the first lens unit, and f2 is a focal length of the second lens unit, Lspw is a distance on an optical axis from a surface closest to the object side of the first lens unit to the aperture stop at a wide-angle end, Lspt is a distance on the optical axis from the surface closest to the object side of the first lens unit to the aperture stop at a telephoto end, and Skw is a distance on the optical axis from a surface closest to the image side of the final lens unit to an image plane.

2. The zoom lens according to claim 1, wherein a following inequality is satisfied:

$$0.1 \le |f1c/f1a| \le 0.9$$

where f1c is a focal length of the third sub-lens unit.

3. The zoom lens according to claim 1, wherein the first sub-lens unit includes a negative lens, and
wherein a following equality is satisfied:

$$45 \le \nu1an \le 70$$

where ν1an is an Abbe number with respect to d-line of the negative lens in the first sub-lens unit.

4. The zoom lens according to claim 1, wherein a following inequality is satisfied:

$$0.2 \le |f1/f1a| \le 0.8.$$

5. The zoom lens according to claim 1, wherein a following inequality is satisfied:

$$0.2 \le \beta1b \le 0.8$$

where β1b is a lateral magnification of the second sub-lens unit in an in-focus state at infinity.

6. The zoom lens according to claim 1, wherein a following inequality is satisfied:

$$-2.0 \le \beta1c \le 0$$

where β1c is a lateral magnification of the third sub-lens unit in an in-focus state at infinity.

7. The zoom lens according to claim 1, wherein the at least two lens units disposed in the middle group that move for zooming include, in order from the object side to the image side, a third lens unit, and a fourth lens unit having a positive refractive power, and
wherein a following inequality is satisfied:

$$0.3 \le |f4/f3| \le 0.7$$

where f3 is a focal length of the third lens unit, and f4 is a focal length of the fourth lens unit.

8. The zoom lens according to claim 1, wherein the second sub-lens unit includes a positive lens, and
wherein a following inequality is satisfied:

$$15 \le \nu1bp \le 40$$

where ν1bp is an Abbe number with respect to d-line of the positive lens.

9. The zoom lens according to claim 1, wherein the third sub-lens unit moves for focusing.

10. An image pickup apparatus comprising:
a zoom lens; and
an image pickup element configured to pick up an image formed by the zoom lens,
wherein the zoom lens includes, in order from an object side to an image side,
a first lens unit that has a positive refractive power and does not move for zooming;
a second lens unit that has a negative refractive power and moves in zooming;
a middle group that has at least two lens units that move in zooming; and
a final lens unit that has a positive refractive power, is disposed closest to the image side, and does not move for zooming,
wherein the zoom lens further comprises an aperture stop that is disposed between a surface closest to the image side of the second lens unit and a surface closest to the object side of the final lens unit, and moves in zooming,
wherein each distance between adjacent lens groups changes in zooming,
wherein the first lens unit includes, in order from the object side to the image side,
a first sub-lens unit that has a negative refractive power and does not move for focusing;
a second sub-lens unit that has a negative refractive power and moves for focusing; and
a third sub-lens unit having a positive refractive power, wherein a distance between the second sub-lens unit and the third sub-lens unit changes for focusing,
wherein the second sub-lens unit includes a negative lens, and
wherein following inequalities are satisfied:

$$0.2 \le f1b/f1a \le 3.2$$
$$35 \le \nu1bn \le 100$$
$$0.3 \le |f2/f1| \le 0.8$$
$$0.08 \le (Lspt - Lspw)/Skw \le 0.80$$

where f1a is a focal length of the first sub-lens unit, f1b is a focal length of the second sub-lens unit, vbn is an Abbe number with respect to d-line of the negative lens in the second sub-lens unit, f1 is a focal length of the first lens unit, and f2 is a focal length of the second lens unit, Lspw is a distance on an optical axis from a surface closest to the object side of the first lens unit to the aperture stop at a wide-angle end, Lspt is a distance on the optical axis from the surface closest to the object side of the first lens unit to the aperture stop at a telephoto end, and Skw is a distance on the optical axis from a surface closest to the image side of the final lens unit to an image plane.

* * * * *